US012689983B2

(12) United States Patent
Chen et al.

(10) Patent No.: US 12,689,983 B2
(45) Date of Patent: Jul. 21, 2026

(54) ENERGY PATTERN-BASED DYNAMIC FREQUENCY SELECTION FOR HIGH-BAND SPECTRUM SHARING

(71) Applicant: QUALCOMM INCORPORATED, San Diego, CA (US)

(72) Inventors: Siyi Chen, Beijing (CN); Arumugam Chendamarai Kannan, San Diego, CA (US); Changlong Xu, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 18/262,142

(22) PCT Filed: Apr. 2, 2021

(86) PCT No.: PCT/CN2021/085274
§ 371 (c)(1),
(2) Date: Jul. 19, 2023

(87) PCT Pub. No.: WO2022/205420
PCT Pub. Date: Oct. 6, 2022

(65) Prior Publication Data
US 2024/0098638 A1 Mar. 21, 2024

(51) Int. Cl.
*H04W 52/02* (2009.01)
*H04W 74/0808* (2024.01)

(52) U.S. Cl.
CPC ... *H04W 52/0229* (2013.01); *H04W 52/0251* (2013.01); *H04W 52/028* (2013.01); *H04W 74/0808* (2013.01)

(58) Field of Classification Search
CPC ......... H04W 52/0216; H04W 52/0219; H04W 52/0229; H04W 52/0251; H04W 52/028; H04W 74/0808
See application file for complete search history.

(56) References Cited

U.S. PATENT DOCUMENTS 9,781,721 B1    10/2017  Yeh
2016/0337063 A1  11/2016  Sadek et al.
(Continued)

FOREIGN PATENT DOCUMENTS

CN        106961289    A    7/2017
WO    WO-2020065121  A1    4/2020
WO    WO-2020190190  A1    9/2020

OTHER PUBLICATIONS

Supplementary European Search Report—EP21934077—Search Authority—The Hague—Dec. 9, 2024.
(Continued)

*Primary Examiner* — Nguyen T Vo
(74) *Attorney, Agent, or Firm* — QUALCOMM Incorporated

(57) ABSTRACT

Methods, systems, and devices for wireless communications are described. A first wireless device may determine an energy pattern corresponding to a characteristic of the first wireless device. The energy pattern may include at least two sub-periods of different energy levels. The first wireless device may transmit the energy pattern on a channel (e.g., an unlicensed channel) prior to transmitting a first message on the channel to indicate the upcoming message to other devices. A second wireless device may monitor the channel during energy detection intervals and may detect the energy pattern. The second wireless device may determine the characteristic of the first wireless device based on detecting the energy pattern and may modify timing for transmission of a second message on the channel based on determining
(Continued)

the characteristic. The first wireless device may transmit the first message on the channel based on transmitting the energy pattern.

26 Claims, 18 Drawing Sheets

(56)                    References Cited

U.S. PATENT DOCUMENTS

| | | | | |
|---|---|---|---|---|
| 2017/0272955 A1* | 9/2017 | Sadek | .................. | H04L 1/0001 |
| 2018/0103472 A1* | 4/2018 | Zhang | .................. | H04W 28/26 |
| 2019/0116475 A1* | 4/2019 | Lee | ..................... | H04W 72/542 |
| 2019/0306690 A1* | 10/2019 | HomChaudhuri | .... | H04W 8/005 |
| 2020/0236555 A1* | 7/2020 | Tomeba | ................ | H04W 16/14 |
| 2021/0410183 A1* | 12/2021 | Fodor | .............. | H04W 74/0808 |

OTHER PUBLICATIONS

International Search Report and Written Opinion—PCT/CN2021/085274—ISA/EPO—Jan. 5, 2022.
ZTE: "Discussion on Channel Access Mechanism for NR-U", 3GPP TSG RAN WG1 Meeting #93, R1-1806462, Busan, Korea, May 21-25, 2018, May 25, 2018 (May 25, 2018) the whole document, pp. 1-6.

\* cited by examiner

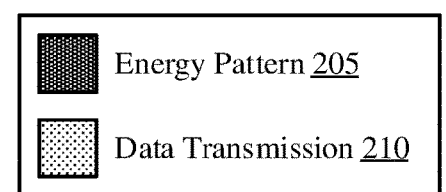
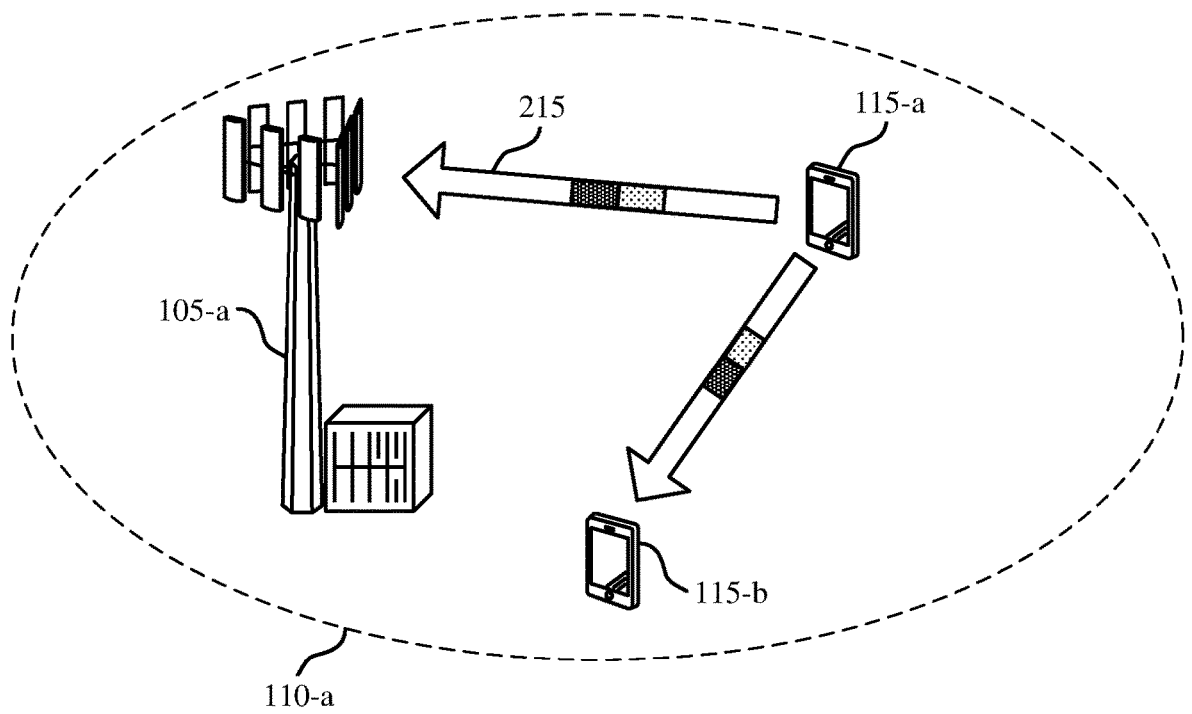
FIG. 2

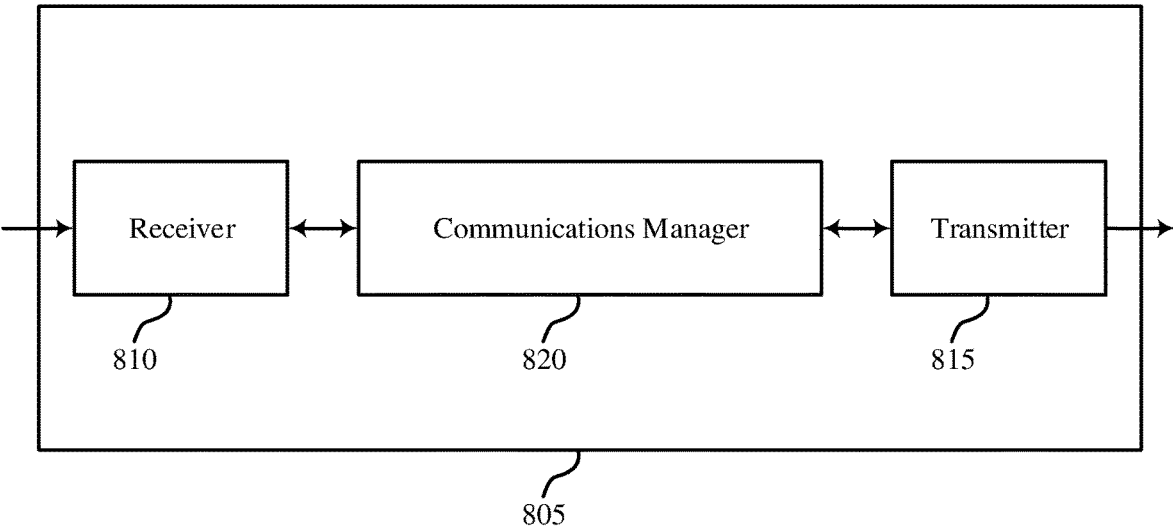
Receiver
Communications Manager
Transmitter
810
820
815
805
800
FIG. 8

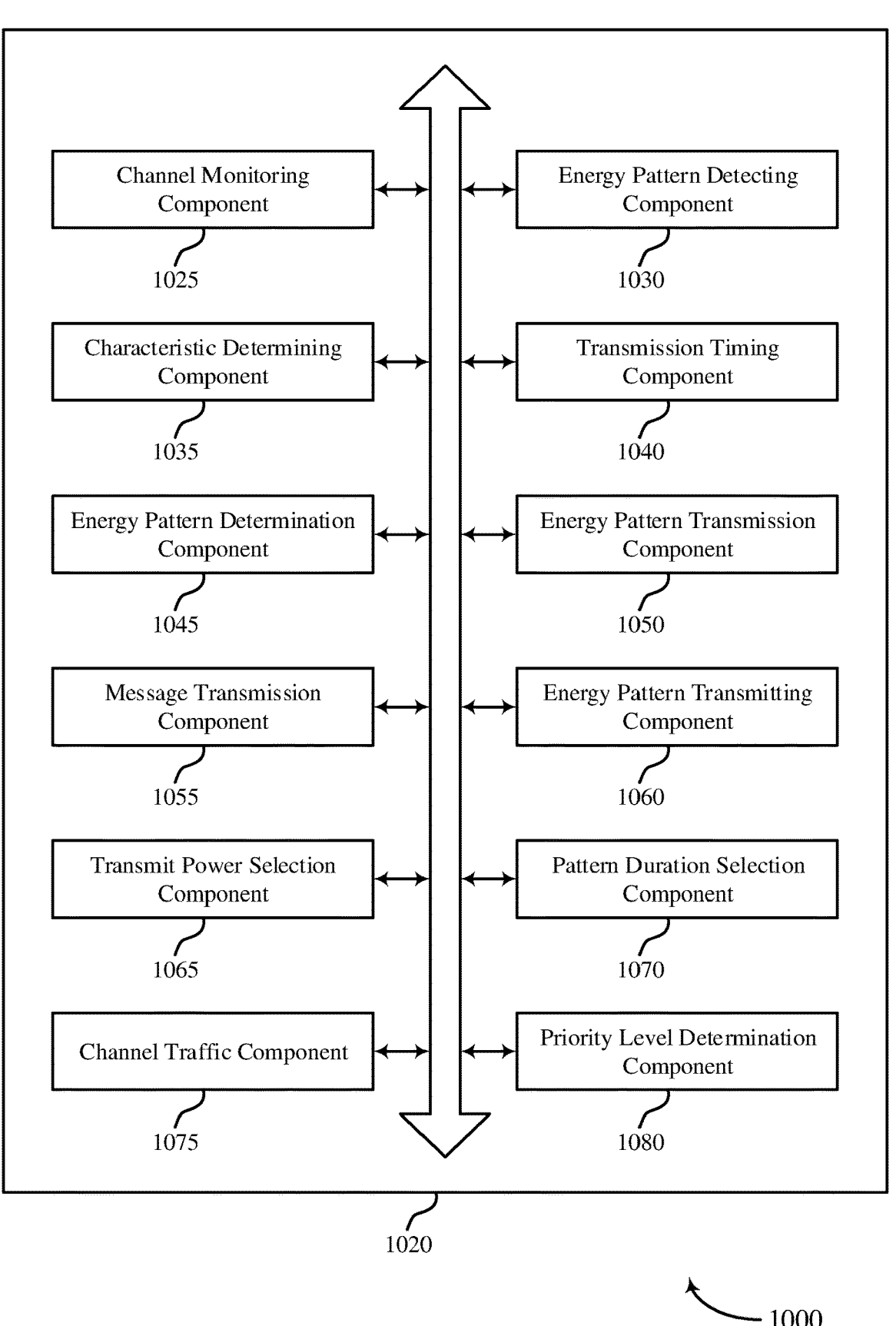

Channel Monitoring Component

1025

Energy Pattern Detecting Component

1030

Characteristic Determining Component

1035

Transmission Timing Component

1040

Energy Pattern Determination Component

1045

Energy Pattern Transmission Component

1050

Message Transmission Component

1055

Energy Pattern Transmitting Component

1060

Transmit Power Selection Component

1065

Pattern Duration Selection Component

1070

Channel Traffic Component

1075

Priority Level Determination Component

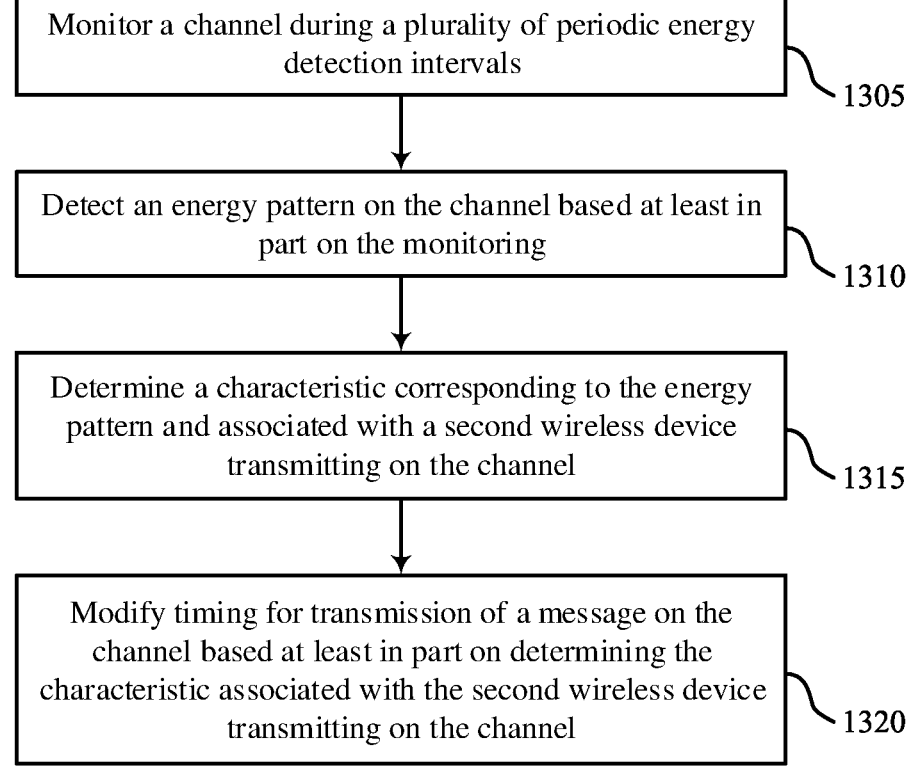

Monitor a channel during a plurality of periodic energy
detection intervals

1305

Detect an energy pattern on the channel based at least in
part on the monitoring

1310

Determine a characteristic corresponding to the energy
pattern and associated with a second wireless device
transmitting on the channel

1315

Modify timing for transmission of a message on the
channel based at least in part on determining the
characteristic associated with the second wireless device
transmitting on the channel

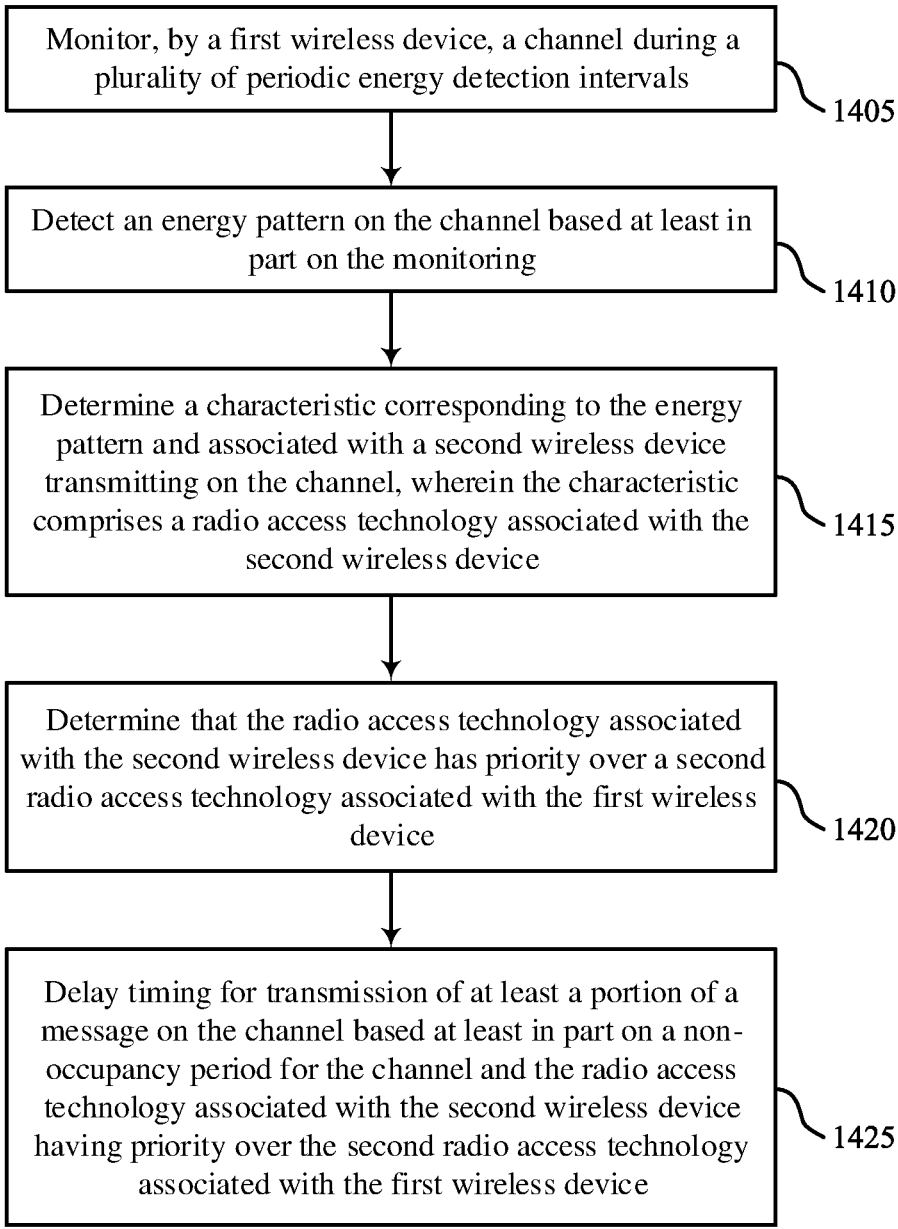

Monitor, by a first wireless device, a channel during a plurality of periodic energy detection intervals

1405

Detect an energy pattern on the channel based at least in part on the monitoring

1410

Determine a characteristic corresponding to the energy pattern and associated with a second wireless device transmitting on the channel, wherein the characteristic comprises a radio access technology associated with the second wireless device

1415

Determine that the radio access technology associated with the second wireless device has priority over a second radio access technology associated with the first wireless device

1420

Delay timing for transmission of at least a portion of a message on the channel based at least in part on a non-occupancy period for the channel and the radio access technology associated with the second wireless device having priority over the second radio access technology associated with the first wireless device

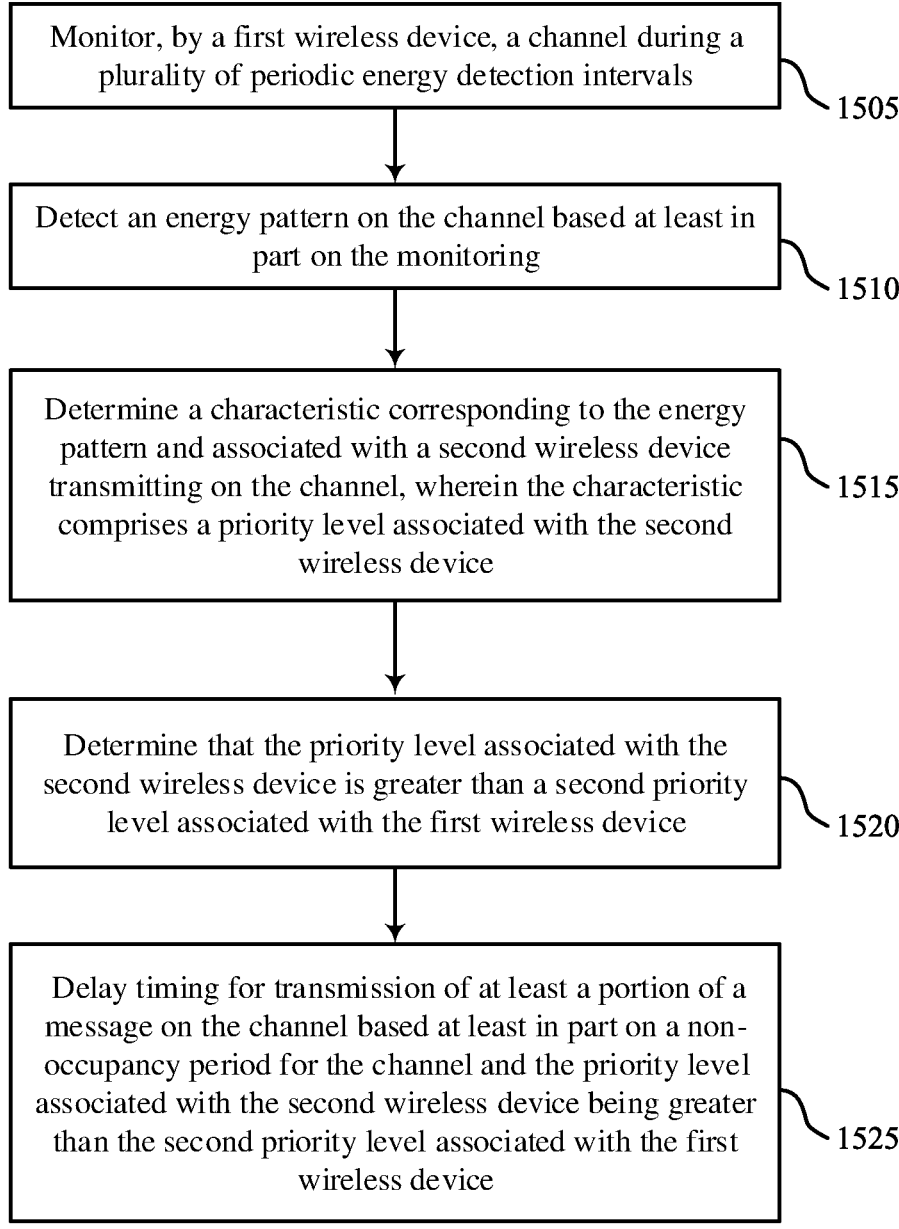

Monitor, by a first wireless device, a channel during a plurality of periodic energy detection intervals

1505

Detect an energy pattern on the channel based at least in part on the monitoring

1510

Determine a characteristic corresponding to the energy pattern and associated with a second wireless device transmitting on the channel, wherein the characteristic comprises a priority level associated with the second wireless device

1515

Determine that the priority level associated with the second wireless device is greater than a second priority level associated with the first wireless device

1520

Delay timing for transmission of at least a portion of a message on the channel based at least in part on a non-occupancy period for the channel and the priority level associated with the second wireless device being greater than the second priority level associated with the first wireless device

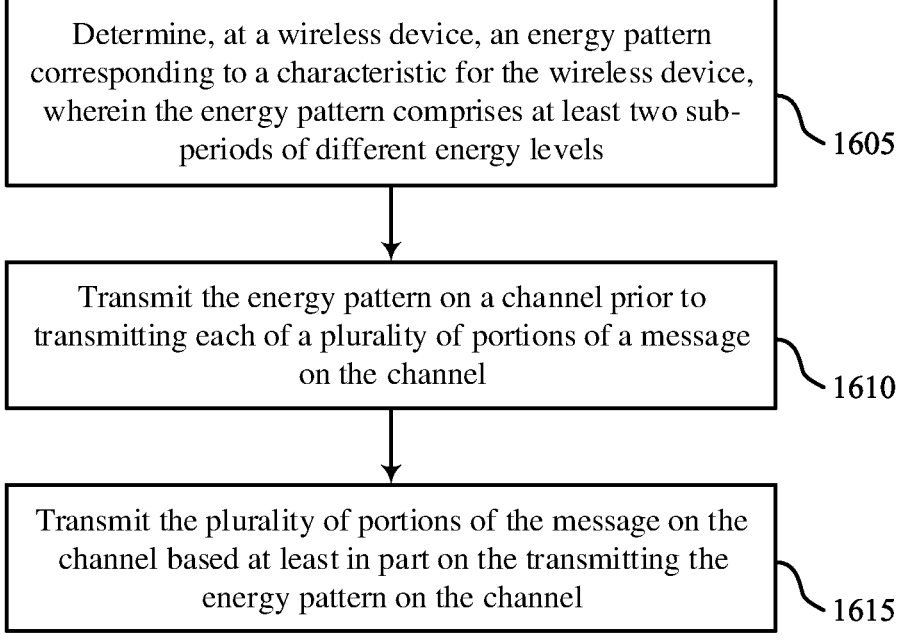

Determine, at a wireless device, an energy pattern corresponding to a characteristic for the wireless device, wherein the energy pattern comprises at least two sub-periods of different energy levels

1605

Transmit the energy pattern on a channel prior to transmitting each of a plurality of portions of a message on the channel

1610

Transmit the plurality of portions of the message on the channel based at least in part on the transmitting the energy pattern on the channel

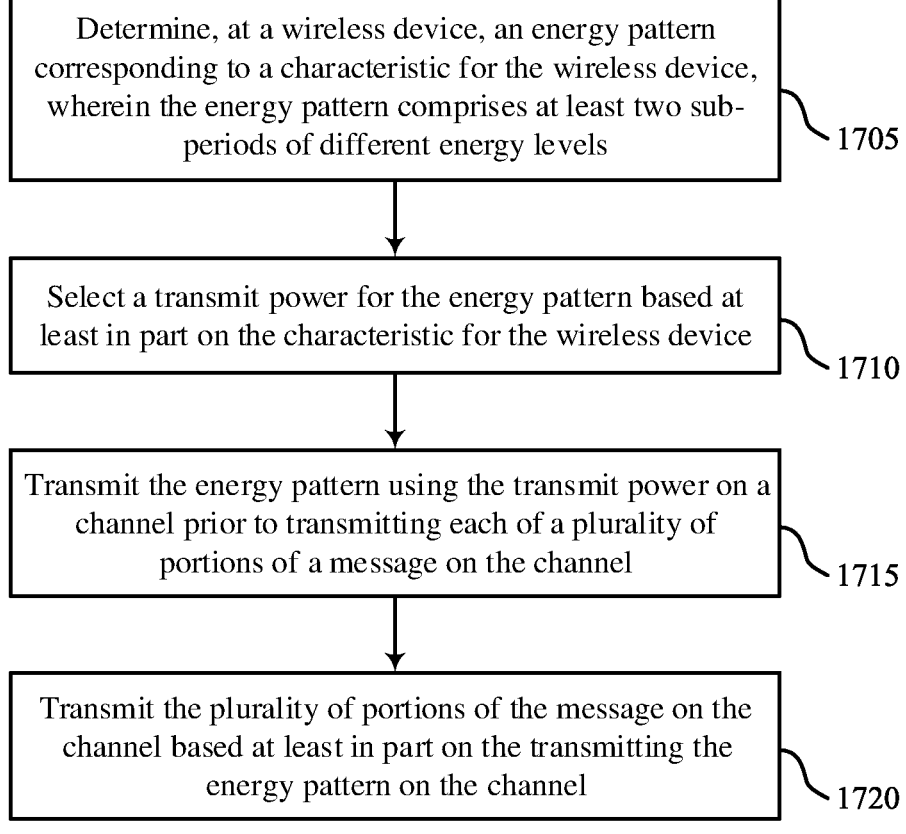

Determine, at a wireless device, an energy pattern corresponding to a characteristic for the wireless device, wherein the energy pattern comprises at least two sub-periods of different energy levels

1705

Select a transmit power for the energy pattern based at least in part on the characteristic for the wireless device

1710

Transmit the energy pattern using the transmit power on a channel prior to transmitting each of a plurality of portions of a message on the channel

1715

Transmit the plurality of portions of the message on the channel based at least in part on the transmitting the energy pattern on the channel

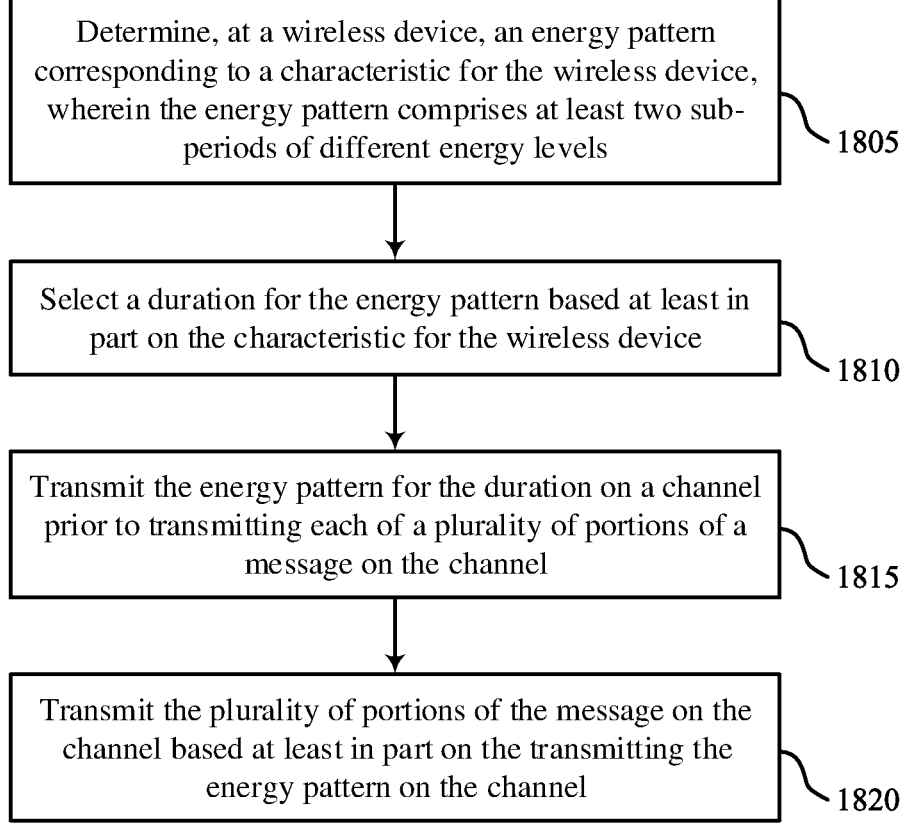

Determine, at a wireless device, an energy pattern corresponding to a characteristic for the wireless device, wherein the energy pattern comprises at least two sub-periods of different energy levels  ⟩1805

Select a duration for the energy pattern based at least in part on the characteristic for the wireless device  ⟩1810

Transmit the energy pattern for the duration on a channel prior to transmitting each of a plurality of portions of a message on the channel  ⟩1815

Transmit the plurality of portions of the message on the channel based at least in part on the transmitting the energy pattern on the channel  ⟩1820

ENERGY PATTERN-BASED DYNAMIC FREQUENCY SELECTION FOR HIGH-BAND SPECTRUM SHARING

CROSS REFERENCE

The present Application is a 371 national stage filing of International PCT Application No. PCT/CN2021/085274 by CHEN et al. entitled "ENERGY PATTERN-BASED DYNAMIC FREQUENCY SELECTION FOR HIGH-BAND SPECTRUM SHARING," filed Apr. 2, 2021, which is assigned to the assignee hereof, and which is expressly incorporated by reference in its entirety herein.

FIELD OF TECHNOLOGY

The following relates to wireless communications, including energy pattern-based dynamic frequency selection (DFS) for high-band spectrum sharing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Aspects of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support communications between wireless devices on a channel in an unlicensed band. In some cases, wireless devices associated with different systems, such as systems using different radio access technologies (RATs), may communicate in the same channel. A first wireless device associated with a first RAT and a second wireless device associated with a second RAT may transmit one or more messages on the channel. In some cases, the one or more message transmissions may overlap in time, frequency, or both. Such overlaps may result in channel congestion, signal collision, interference, or any combination thereof, effectively reducing communication reliability and channel throughput.

SUMMARY

The present disclosure relates to methods, systems, devices, and apparatuses that support energy pattern-based dynamic frequency selection (DFS) for high-band spectrum sharing. Generally, the described techniques provide for a DFS procedure that improves the reliability of communications in an unlicensed band, such as a millimeter wave (mmW) band. In some aspects, wireless devices associated with different radio access technologies (RATs) may transmit communications (e.g., one or more messages) on a channel in the unlicensed band. To mitigate collisions and interference between the communications, the wireless devices may transmit energy patterns on the channel before transmitting the communications. In one aspect, a wireless device may transmit an energy pattern on the channel to indicate that the wireless device is transmitting (or is about to transmit) one or more messages on the channel. Other wireless devices may be configured to monitor the channel for energy patterns and may refrain from transmitting on the channel for a time duration based on detecting an energy pattern. In some aspects, a wireless device may transmit an energy pattern with different energy states (e.g., on or off), different energy levels (e.g., magnitudes), or both to indicate a specific RAT, priority level, or both corresponding to the wireless device or the transmission on the channel. In some aspects, if a relatively lower priority wireless device detects an energy pattern corresponding to a relatively higher priority wireless device, the lower priority wireless device may refrain from transmitting on the channel for a time duration. In comparison to wireless systems that support blind (e.g., unregulated) coexistence of different RATs in an unlicensed band, the techniques described herein may support improved spectral efficiency and higher reliability based on using energy patterns to reduce collisions and interference between communications (e.g., for different RATs) in the unlicensed band.

A method for wireless communications implemented by a first wireless device is described. The method may include monitoring a channel during a set of multiple periodic energy detection intervals, detecting an energy pattern on the channel based on the monitoring, determining a characteristic corresponding to the energy pattern and associated with a second wireless device transmitting on the channel, and modifying timing for transmission of a message on the channel based on determining the characteristic associated with the second wireless device transmitting on the channel.

An apparatus for wireless communications implemented by a first wireless device is described. The apparatus may include a processor, memory coupled with the processor, and instructions stored in the memory. The instructions may be executable by the processor to cause the apparatus to monitor a channel during a set of multiple periodic energy detection intervals, detect an energy pattern on the channel based on the monitoring, determine a characteristic corresponding to the energy pattern and associated with a second wireless device transmitting on the channel, and modify timing for transmission of a message on the channel based on determining the characteristic associated with the second wireless device transmitting on the channel.

Another apparatus for wireless communications implemented by a first wireless device is described. The apparatus may include means for monitoring a channel during a set of multiple periodic energy detection intervals, means for detecting an energy pattern on the channel based on the monitoring, means for determining a characteristic corresponding to the energy pattern and associated with a second wireless device transmitting on the channel, and means for modifying timing for transmission of a message on the channel based on determining the characteristic associated with the second wireless device transmitting on the channel.

A non-transitory computer-readable medium storing code for wireless communications implemented by a first wireless device is described. The code may include instructions executable by a processor to monitor a channel during a set of multiple periodic energy detection intervals, detect an energy pattern on the channel based on the monitoring, determine a characteristic corresponding to the energy pattern and associated with a second wireless device transmitting on the channel, and modify timing for transmission of a message on the channel based on determining the characteristic associated with the second wireless device transmitting on the channel.

In some aspects of the method, apparatuses, and non-transitory computer-readable medium described herein, determining the characteristic may include operations, features, means, or instructions for determining two or more energy levels associated with the energy pattern, where determining the characteristic corresponding to the energy pattern may be based on determining the two or more energy levels associated with the energy pattern.

In some aspects of the method, apparatuses, and non-transitory computer-readable medium described herein, determining the characteristic may include operations, features, means, or instructions for determining the characteristic corresponding to the energy pattern based on a difference between a first power level and a second power level for the energy pattern, a duration of the energy pattern, or both.

In some aspects of the method, apparatuses, and non-transitory computer-readable medium described herein, the characteristic includes a RAT associated with the second wireless device. The method, apparatuses, and non-transitory computer-readable medium may include further operations, features, means, or instructions for determining that the RAT associated with the second wireless device may have priority over a second RAT associated with the first wireless device, where modifying the timing for the transmission of the message on the channel includes delaying the timing for transmission of at least a portion of the message on the channel based on a non-occupancy period for the channel and the RAT associated with the second wireless device having priority over the second RAT associated with the first wireless device.

In some aspects of the method, apparatuses, and non-transitory computer-readable medium described herein, the characteristic includes a priority level associated with the second wireless device and the method, apparatuses, and non-transitory computer-readable medium may include further operations, features, means, or instructions for determining that the priority level associated with the second wireless device may be greater than a second priority level associated with the first wireless device, where modifying the timing for transmission of the message on the channel includes delaying the timing for transmission of at least a portion of the message on the channel based on a non-occupancy period for the channel and the priority level associated with the second wireless device being greater than the second priority level associated with the first wireless device.

In some aspects of the method, apparatuses, and non-transitory computer-readable medium described herein, monitoring the channel may include operations, features, means, or instructions for monitoring the channel according to a sensing duration corresponding to a second RAT, a second priority level, or both associated with the first wireless device.

In some aspects of the method, apparatuses, and non-transitory computer-readable medium described herein, monitoring the channel may include operations, features, means, or instructions for performing a beam sweep procedure for a set of multiple communication beams, where the energy pattern may be detected on at least one communication beam of the set of multiple communication beams based on the beam sweep procedure.

In some aspects of the method, apparatuses, and non-transitory computer-readable medium described herein, monitoring the channel may include operations, features, means, or instructions for monitoring the channel using each communication beam of the set of multiple communication beams for a beam-specific sensing duration, where the beam-specific sensing duration may be based on a duration of the energy pattern.

Some aspects of the method, apparatuses, and non-transitory computer-readable medium described herein may further include operations, features, means, or instructions for transmitting a second energy pattern on the channel prior to transmission of one or more portions of the message on the channel, the second energy pattern indicating a second characteristic associated with the first wireless device.

Some aspects of the method, apparatuses, and non-transitory computer-readable medium described herein may further include operations, features, means, or instructions for periodically transmitting the second energy pattern on the channel based on a frequency value, where the frequency value may be based on the characteristic associated with the first wireless device.

In some aspects of the method, apparatuses, and non-transitory computer-readable medium described herein, the characteristic associated with the second wireless device may be configured for the second wireless device or may be based on an amount of traffic on the channel.

In some aspects of the method, apparatuses, and non-transitory computer-readable medium described herein, the channel corresponds to a shared mmW band.

A method for wireless communications implemented by a wireless device is described. The method may include determining an energy pattern corresponding to a characteristic for the wireless device, where the energy pattern includes at least two sub-periods of different energy levels, transmitting the energy pattern on a channel prior to transmitting each of a set of multiple portions of a message on the channel, and transmitting the set of multiple portions of the message on the channel based on the transmitting the energy pattern on the channel.

An apparatus for wireless communications implemented by a wireless device is described. The apparatus may include a processor, memory coupled with the processor, and instructions stored in the memory. The instructions may be executable by the processor to cause the apparatus to determine an energy pattern corresponding to a characteristic for the wireless device, where the energy pattern includes at least two sub-periods of different energy levels, transmit the energy pattern on a channel prior to transmitting each of a set of multiple portions of a message on the channel, and transmit the set of multiple portions of the message on the channel based on the transmitting the energy pattern on the channel.

Another apparatus for wireless communications implemented by a wireless device is described. The apparatus may include means for determining an energy pattern corresponding to a characteristic for the wireless device, where the energy pattern includes at least two sub-periods of different energy levels, means for transmitting the energy pattern on a channel prior to transmitting each of a set of multiple portions of a message on the channel, and means for transmitting the set of multiple portions of the message on the channel based on the transmitting the energy pattern on the channel.

A non-transitory computer-readable medium storing code for wireless communications implemented by a wireless device is described. The code may include instructions executable by a processor to determine an energy pattern corresponding to a characteristic for the wireless device, where the energy pattern includes at least two sub-periods of different energy levels, transmit the energy pattern on a channel prior to transmitting each of a set of multiple portions of a message on the channel, and transmit the set of multiple portions of the message on the channel based on the transmitting the energy pattern on the channel.

In some aspects of the method, apparatuses, and non-transitory computer-readable medium described herein, determining the energy pattern may include operations, features, means, or instructions for determining an on-off pattern for the energy pattern, an energy level pattern for the energy pattern, or a combination thereof based on the characteristic for the wireless device.

Some aspects of the method, apparatuses, and non-transitory computer-readable medium described herein may further include operations, features, means, or instructions for selecting a transmit power for the energy pattern based on the characteristic for the wireless device, where the energy pattern may be transmitted using the transmit power.

Some aspects of the method, apparatuses, and non-transitory computer-readable medium described herein may further include operations, features, means, or instructions for selecting a duration for the energy pattern based on the characteristic for the wireless device, where the energy pattern may be transmitted for the duration.

In some aspects of the method, apparatuses, and non-transitory computer-readable medium described herein, transmitting the energy pattern may include operations, features, means, or instructions for performing a beam sweep procedure for a set of multiple communication beams, where the energy pattern may be transmitted on each communication beam of the set of multiple communication beams based on the beam sweep procedure.

In some aspects of the method, apparatuses, and non-transitory computer-readable medium described herein, transmitting the energy pattern may include operations, features, means, or instructions for transmitting a set of multiple repetitions of the energy pattern on at least one communication beam of the set of multiple communication beams.

In some aspects of the method, apparatuses, and non-transitory computer-readable medium described herein, transmitting the energy pattern may include operations, features, means, or instructions for periodically transmitting the energy pattern on the channel based on a frequency value, where the frequency value may be based on the characteristic for the wireless device.

In some aspects of the method, apparatuses, and non-transitory computer-readable medium described herein, the characteristic for the wireless device may be configured at the wireless device.

In some aspects of the method, apparatuses, and non-transitory computer-readable medium described herein, the characteristic includes a priority level of the wireless device and the method, apparatuses, and non-transitory computer-readable medium may include further operations, features, means, or instructions for sensing an amount of traffic on the channel and determining the priority level for the wireless device based on the amount of traffic on the channel.

In some aspects of the method, apparatuses, and non-transitory computer-readable medium described herein, the channel corresponds to a shared mmW band.

In some aspects of the method, apparatuses, and non-transitory computer-readable medium described herein, the characteristic includes a RAT, a priority level, or both.

BRIEF DESCRIPTION OF THE DRAWINGS

FIGS. 1 and 2 illustrate aspects of wireless communications systems that support energy pattern-based dynamic frequency selection (DFS) for high-band spectrum sharing in accordance with aspects of the present disclosure.

FIGS. 8 and 9 show block diagrams of devices that support energy pattern-based DFS for high-band spectrum sharing in accordance with aspects of the present disclosure.

FIG. 10 shows a block diagram of a communications manager that supports energy pattern-based DFS for high-band spectrum sharing in accordance with aspects of the present disclosure.

FIGS. 13 through 18 show flowcharts illustrating methods that support energy pattern-based DFS for high-band spectrum sharing in accordance with aspects of the present disclosure.

DETAILED DESCRIPTION

Figure 1:
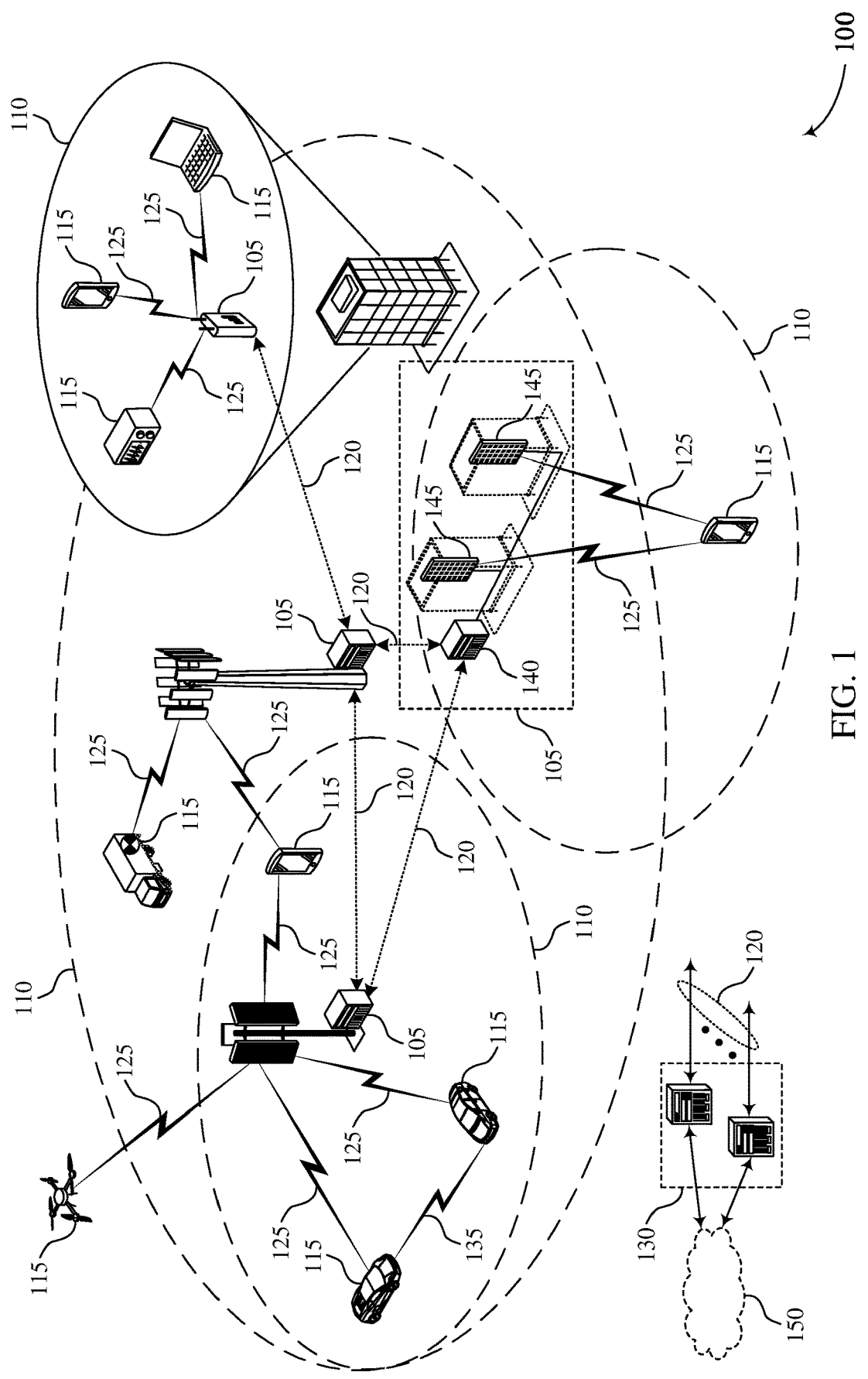

Some wireless communications systems may include wireless devices, such as a user equipment (UE), a base station, a station (STA), an access point (AP), or any other wireless devices. In some cases, these wireless devices may be associated with different radio access technologies (RATs). Different RATs may include fourth generation (4G) systems, such as Long Term Evolution (LTE) systems, fifth generation (5G) systems, which may be referred to as new radio (NR) systems, wireless local access network (WLAN) systems, which may include WiFi systems, or any other systems supporting wireless communications. In some aspects, wireless devices associated with different RATs may transmit communications on a channel in an unlicensed band (e.g., a millimeter wave (mmW) band). In some cases, a first wireless device associated with a first RAT may transmit, to a second device associated with the first RAT, an indication that the first wireless device is using (or is going to use) the channel for a time duration. Accordingly, the second wireless device associated with the first RAT may refrain from transmitting on the channel for the indicated time duration to avoid a collision. However, a third wireless device associated with a second RAT may be unable to decode the indication from the first wireless device. As such, the third wireless device may be unaware that the first wireless device is using (or is going to use) the channel for the indicated time duration and may transmit communications that collide and interfere with communications of the first wireless device. Such collisions and interference may lead to inefficient and unreliable usage of the channel in the unlicensed band.

In accordance with aspects of the present disclosure, wireless devices operating in an unlicensed band may be configured to transmit and detect energy patterns on a channel before transmitting communications on the channel. In one aspect, a first wireless device associated with a first RAT may be configured to transmit an energy pattern on the channel before transmitting one or more messages. The energy pattern may indicate, to other wireless devices in the unlicensed band, that the first wireless device is transmitting (or is going to transmit) the one or more messages on the channel. A second wireless device associated with a second RAT may be configured to monitor the channel for energy patterns from other wireless devices (e.g., wireless devices associated with different RATs). As such, the second wireless device may detect the energy pattern from the first wireless device and may refrain from transmitting on the channel for a time duration based on detecting the energy pattern. Transmitting energy patterns on a channel prior to transmitting data on the channel may enable wireless devices associated with different RATs to mitigate interference and congestion on the channel. Thus, in comparison to wireless systems that support blind (e.g., unregulated) coexistence of different RATs in an unlicensed band, the techniques described herein may support improved spectral efficiency and higher reliability based on using energy patterns to reduce collisions and interference between communications (e.g., of different RATs) in the unlicensed band.

In some aspects, an energy pattern may indicate one or more characteristics of a wireless device, such as a RAT associated with the wireless device, a priority level associated with the wireless device, or both. In one aspect, the first wireless device associated with the first RAT may transmit an energy pattern (e.g., on the channel in the unlicensed band) that indicates one or both of the first RAT or a priority level of the first wireless device. If a priority level of the first wireless device is higher than a priority level of the second wireless device, the second wireless device may refrain from transmitting on the channel for a time duration (e.g., a non-occupancy period) based on detecting the specific energy pattern from the first wireless device. In some aspects, the priority level of a wireless device may be based on a time at which the wireless device last accessed the channel, a type of data that the wireless device is scheduled to transmit on the channel, a RAT associated with the wireless device, a traffic level of the channel, or a combination thereof.

In some aspects, a wireless device may transmit an energy pattern with different energy states (e.g., on or off), different energy levels (e.g., magnitudes), or both based on one or more characteristics of the wireless device. In one aspect, the first wireless device may transmit an energy pattern with specific energy states and energy levels based on the first RAT associated with the first wireless device, the first priority level of the first wireless device, or both. Accordingly, the second wireless device may determine that the energy pattern indicates a transmission using the first RAT, of the first priority level, or both based on measuring the specific energy states and energy levels of the energy pattern.

Additionally or alternatively, a wireless device may transmit an energy pattern with a transmit power, a transmit duration, or both that correspond to one or more characteristics of the wireless device. In one aspect, the first wireless device may transmit an energy pattern with a transmit power, a transmit duration, or both that correspond to the first RAT associated with the first wireless device, the priority level associated with the first device, or both. In some cases, a wireless device may periodically transmit energy patterns on a channel (e.g., in an unlicensed band) during a transmission period to protect a data transmission on the channel (e.g., to indicate to wireless devices of other RATs that the channel is occupied by the data transmission). In some aspects, a wireless device may transmit an energy pattern over multiple different communication beams such that the energy pattern can be detected by wireless devices in different locations.

Aspects of the present disclosure may support one or more of the following potential advantages or improvements, among others. The present disclosure may provide benefits and enhancements to the operation of a wireless device (e.g., a UE, a base station, a STA, an AP). In one aspect, the present disclosure may provide improvements to communications between wireless devices on a channel in an unlicensed band. More specifically, the techniques described herein may provide for reduced inter-RAT signal collisions, decreased inter-RAT interference, and improved reliability (e.g., with respect to communications systems that support unregulated usage of unlicensed band channels) based on transmitting energy patterns on a channel prior to a data transmission, where the energy patterns are detectable by wireless devices of other RATs.

Aspects of the disclosure are initially described in the context of wireless communications systems. Additional aspects of the disclosure are illustrated by and described with reference to transmission schedules, energy patterns, and beam configurations. Aspects of the disclosure are further illustrated by and described with reference to apparatus diagrams, system diagrams, and flowcharts that relate to energy pattern-based dynamic frequency selection (DFS) for high-band spectrum sharing.

FIG. 1 illustrates an aspect of a wireless communications system 100 that supports energy pattern-based DFS for high-band spectrum sharing in accordance with aspects of the present disclosure. The wireless communications system 100 may include one or more base stations 105, one or more UEs 115, and a core network 130. In some aspects, the wireless communications system 100 may be a Long Term Evolution (LTE) network, an LTE-Advanced (LTE-A) network, an LTE-A Pro network, or a New Radio (NR) network. In some aspects, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an aspect of a geographic area over which a base station 105 and a UE 115 may support the communication of signals according to one or more RATs.

The UEs 115 may be dispersed throughout a coverage area 110 of the wireless communications system 100, and each UE 115 may be stationary, or mobile, or both at different times. The UEs 115 may be devices in different forms or having different capabilities. Some UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. In one aspect, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some aspects, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other aspects. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other aspects, which may be implemented in various objects such as appliances, or vehicles, meters, among other aspects.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other aspects, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. In one aspect, a carrier used for a communication link 125 may include a portion of a radio frequency spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some aspects (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different RAT).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and In some aspects the carrier bandwidth may be referred to as a "system bandwidth" of the carrier or the wireless communications system 100. In one aspect, the carrier bandwidth may be one of a number of determined bandwidths for carriers of a particular RAT (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some aspects, the wireless communications system 100 may include base stations 105 or UEs 115 that support simultaneous communications via carriers associated with multiple carrier bandwidths. In some aspects, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (A f) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the base stations 105 or the UEs 115 may be expressed in multiples of a basic time unit which may, In one aspect, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some aspects, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, In one aspect, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. In one aspect, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, In one aspect a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some aspects, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. In one aspect, a cell may be or include a building, a subset of a building, or exterior spaces between or overlapping with geographic coverage areas 110, among other aspects.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some aspects, a carrier may support multiple cells, and different cells may be configured according to different protocol types (e.g., MTC, narrowband IoT (NB-IoT), enhanced mobile broadband (eMBB)) that may provide access for different types of devices.

In some aspects, a base station 105 may be movable and therefore provide communication coverage for a moving geographic coverage area 110. In some aspects, different geographic coverage areas 110 associated with different technologies may overlap, but the different geographic coverage areas 110 may be supported by the same base station 105. In other aspects, the overlapping geographic coverage areas 110 associated with different technologies may be supported by different base stations 105. The wireless communications system 100 may include, In one aspect, a heterogeneous network in which different types of the base stations 105 provide coverage for various geographic coverage areas 110 using the same or different RATs.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, In some aspects, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some aspects, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Aspects of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some aspects, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. In one aspect, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. In one aspect, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some aspects, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some aspects, groups of the UEs 115 communicating via D2D communications may utilize a one-to-many (1:M) system in which each UE 115 transmits to every other UE 115 in the group. In some aspects, a base station 105 facilitates the scheduling of resources for D2D communications. In other cases, D2D communications are carried out between the UEs 115 without the involvement of a base station 105.

In some systems, the D2D communication link 135 may be an aspect of a communication channel, such as a sidelink communication channel, between vehicles (e.g., UEs 115). In some aspects, vehicles may communicate using vehicleto-everything (V2X) communications, vehicle-to-vehicle (V2V) communications, or some combination of these. A vehicle may signal information related to traffic conditions, signal scheduling, weather, safety, emergencies, or any other information relevant to a V2X system. In some aspects, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an aspect of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some aspects, the wireless communications system 100 may support mmW communications between the UEs 115 and the base stations 105, and EHF antennas of the respective devices may be smaller and more closely spaced than UHF antennas. In some aspects, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. In one aspect, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some aspects, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other aspects.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. In one aspect, one or more base station antennas or antenna arrays may be co-located at an antenna assembly, such as an antenna tower. In some aspects, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, In one aspect, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. In one aspect, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. In one aspect, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some aspects, the beam direction associated with transmissions along a single beam direction may be determined based on a signal that was transmitted in one or more beam directions. In one aspect, a UE 115 may receive one or more of the signals transmitted by the base station 105 in different directions and may report to the base station 105 an indication of the signal that the UE 115 received with a highest signal quality or an otherwise acceptable signal quality.

In some aspects, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. In one aspect, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some aspects, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARM) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, wireless devices (e.g., UEs 115, base stations 105, or both) associated with different RATs may transmit communications (e.g., one or more messages) on a channel in an unlicensed band (e.g., a mmW band). In some cases, another wireless communications systems (e.g., a WLAN system) may coexist with the wireless communications system 100 and may share resources of a spectrum band, such as an unlicensed band. To mitigate collisions and interference between communications of the different systems, the wireless devices may transmit energy patterns on the channel prior to the communications. In one aspect, a wireless device may transmit an energy pattern on the channel to indicate that the wireless device is transmitting (or is going to transmit) one or more messages on the channel. Other wireless devices may be configured to monitor the channel (e.g., during multiple periodic energy detection intervals) for energy patterns and may refrain from transmitting on the channel for a time duration (e.g., a non-occupancy period) based on detecting an energy pattern.

In some aspects, a wireless device may transmit an energy pattern with different energy states (e.g., on or off), different energy levels (e.g., magnitudes), or both based on a RAT, a priority level, or both corresponding to the wireless device, the upcoming transmission, or both. If a relatively lower priority wireless device detects an energy pattern corresponding to a relatively higher priority wireless device, the lower priority wireless device may refrain from transmitting on the channel for a time duration. In comparison to wireless communications systems that support blind (e.g., unregulated) coexistence of different RATs in an unlicensed band, the techniques described herein may support improved spectral efficiency and higher reliability based on using energy patterns to reduce inter-RAT collisions and interference between communications in the unlicensed band.

FIG. 2 illustrates an aspect of a wireless communications system 200 that supports energy pattern-based DFS for high-band spectrum sharing in accordance with aspects of the present disclosure. The wireless communications system 200 may implement aspects of the wireless communications system 100. In one aspect, the wireless communications system 200 may include a base station 105-*a*, a UE 115-*a*, and a UE 115-*b*, which may be aspects of corresponding devices described herein with reference to FIG. 1. The base station 105-*a* and the UE 115-*a* may communicate over a communication link 215 within a geographic coverage area 110-*a* of the base station 105-*a*. In some aspects, the UE 115-*a* may transmit an energy pattern 205 on a channel (e.g., a mmW channel) in an unlicensed band prior to transmitting a data transmission 210 to the base station 105-*a* on the channel. A UE 115-*b* may detect the energy pattern 205 and may refrain from transmitting on the channel for a time duration based on detecting the energy pattern 205. In comparison to transmitting the data transmission 210 while the UE 115-*b* is using the channel, transmitting the energy pattern 205 may reduce a number of collisions between the data transmission 210 and transmissions from the UE 115-*b*. Thus, compared to cases in which transmissions from the UE 115-*b* collide with the data transmission 210, transmitting the energy pattern 205 before the data transmission 210 may enable the UE 115-*a* to perform more reliable and efficient communications with the base station 105-*a* on the channel.

Some wireless communications systems may utilize DFS to facilitate coexistence of wireless devices in a frequency band (e.g., a 5 GHz band). DFS may be a spectrum-sharing mechanism that enables a first RAT (e.g., WLAN) to coexist with a second RAT (e.g., a radar-based RAT). In some cases, a wireless device associated with the first RAT may use DFS to detect interference associated with the second RAT and move to a different frequency with less interference than the frequency at which the interference was detected. As such, DFS may enable the wireless device associated with the first RAT to automatically select a frequency in the frequency band such that the frequency does not interfere with devices associated with the second RAT.

The wireless device associated with the first RAT may maintain a non-occupancy list (NOL) of channels (e.g., frequencies) on which interference associated with the second RAT has been detected. The wireless device (e.g., an AP) may avoid communicating using a channel on the NOL for a time duration (e.g., at least 30 minutes) after detecting such interference on the channel. In some cases, the wireless device may monitor a channel in the frequency band for interference associated with the second RAT before securing the channel. Additionally or alternatively, the wireless device may scan the channel continuously (e.g., during normal operation) for signal patterns associated with the second RAT. In some cases, the wireless device may transmit a beacon on the channel and may perform a DFS procedure based on the beacon, a timing offset associated with the beacon, or both.

The wireless device associated with the first RAT may be configured with one or more DFS parameters, which may include a non-occupancy period, a channel availability check time, a channel move time, or a combination thereof. The non-occupancy period may specify a time duration (e.g., 30 minutes) in which the wireless device may refrain from using a channel after detecting a waveform associated with the second RAT on the channel. The channel availability check time may specify a time duration (e.g., 60 seconds) in which the wireless device may perform a channel availability check on a channel. The wireless device may perform a channel availability check based on periodically monitoring the channel to determine if a waveform associated with the second RAT is present on the channel and determining if the waveform is above a DFS detection threshold. The channel move time may specify a time duration (e.g., 10 seconds) in which the wireless device may cease all transmissions on a channel after detecting a waveform associated with the second RAT on the channel and determining that the waveform is above the DFS detection threshold.

A signal associated with the second RAT may include a burst of high frequency signal pulses. The signal may be repeated after a time duration, which may also be referred to as a sweep time. In some cases, the signal may include different frequencies, a different number of pulses in the burst, different pulse repetition frequencies within the burst, or a combination thereof. The sweep time may be a result of a wireless device associated with the second RAT performing an angular rotation (e.g., of 360°) of the signal transmission during a time period, which may be referred to as a sweep period. In some cases, the sweep period may be relatively short (e.g., 30 seconds). As such, the wireless device associated with the first RAT may be capable of detecting the signal in a relatively short time interval (e.g., a fraction of a second) when the signal is transmitted in the direction of the wireless device during the sweep. In this relatively short time interval, the wireless device associated with the first RAT may detect one or more pulses separated by a time period (e.g., a period of 250 microseconds ($\mu$s)-20 milliseconds (ms)). In some cases, each pulse may last for 2 $\mu$s or less. The wireless device associated with the first RAT may identify the signal based on identifying a pattern associated with the signal.

In some other wireless communications systems that support directional beamforming communications between wireless devices in an unlicensed band (e.g., a mmW band), the likelihood of collisions and interference in the unlicensed band may be lower than the likelihood of collisions and interference in other frequency bands (e.g., sub-7 GHz bands). The relatively higher transmit and receive directionality of communications in the unlicensed band may reduce the likelihood that a wireless device may detect a given transmission in the band (e.g., if the specific direction of the transmission causes the signal strength to be below a detection threshold at the wireless device). Such directional transmissions may enable wireless devices to perform fewer listen-before-talk (LBT) procedures while communicating in the unlicensed band. In some cases, the unlicensed band may not support such LBT procedures. In such cases, even though the likelihood of collisions and interference in the unlicensed band may be lower than in other frequency bands, some collisions and interference may occur, resulting in performance loss in the unlicensed band.

In some cases, a channel in the unlicensed band may support relatively narrow (e.g., highly-directional) beamforming communications from a relatively higher priority system and one or more relatively lower priority systems. Additionally or alternatively, the channel may support one or more equal priority systems. In some cases, these systems may also be associated with different RATs. In such cases, the channel may not support LBT procedures between systems that are associated with different priority levels, different RATs, or both. As a result, these systems may experience unreliable communications on the channel (e.g., due to inter-system interference and collisions).

In accordance with aspects of the present disclosure, the wireless communications system 200 may support DFS procedures in an unlicensed band (e.g., a shared mmW band). Wireless devices in the wireless communications system 200 may use mechanisms described herein to avoid collisions and interference, mitigating performance loss in the unlicensed band. DFS procedures may improve the reliability and efficiency of communications in the unlicensed band (e.g., compared to systems that do not support LBT procedures in unlicensed bands) based on enabling wireless devices to detect other wireless devices (or networks) deployed in the unlicensed band. More specifically, the wireless communications system 200 may enable a UE 115-b to detect a UE 115-a based on the UE 115-a transmitting an energy pattern 205 on a channel in the unlicensed band. The UE 115-a may transmit the energy pattern 205 with different energy states (e.g., on or off), energy levels (e.g., magnitudes), or both based on a RAT associated with the UE 115-a, a priority level associated with the UE 115-a, or both. In some aspects, the energy pattern 205 may indicate a data transmission 210 that the UE 115-a is transmitting (or is scheduled to transmit) to a base station 105-a on the channel. The UE 115-b may monitor the channel and may refrain from transmitting on the channel for a time duration if the energy pattern 205 is detected. Thus, in comparison to transmitting the data transmission 210 on the channel while the UE 115-b is also transmitting on the channel, the UE 115-a may communicate with the base station 105-a with improved reliability and greater efficiency, among other benefits.

In some aspects, the wireless communications system 200 may support different energy patterns for different systems operating in the unlicensed band. These different energy patterns may include RAT-specific energy patterns, priority-based energy patterns, or both. In one aspect, if the UE 115-*a* is associated with a first RAT and a first priority level, the energy pattern 205 may correspond to the first RAT, the first priority level, or both. More specifically, the UE 115-*a* may transmit the energy pattern 205 with different energy states, different energy levels, or both based on the first RAT, the first priority level, or both. The different energy states, energy levels, or both may enable the UE 115-*b* to distinguish the energy pattern 205 from noise on the channel. Additionally, the UE 115-*b* may identify the first RAT, the first priority level, or both associated with the UE 115-*a* determined to be transmitting on the channel.

In some aspects, each RAT deployed on the channel may have a unique energy pattern. In one aspect, an NR unlicensed (NR-U) access RAT may have a first unique energy pattern, an NR-U sidelink RAT may have a second unique energy pattern, and a WiFi RAT may have a third unique energy pattern, among others. If the energy pattern 205 is a RAT-specific energy pattern, the energy pattern 205 may be unique to the first RAT associated with the UE 115-*a*. In such aspects, the UE 115-*b* may detect the energy pattern 205 on the channel and determine that the energy pattern 205 corresponds to the first RAT. The UE 115-*b* may detect the energy pattern 205 even if the UE 115-*b* is associated with a second RAT that is different from the first RAT. As such, wireless devices associated with different RATs may share the channel based on using energy patterns to indicate impending data transmissions on the channel.

Additionally or alternatively, the energy pattern 205 may be a priority-based energy pattern. That is, the energy pattern 205 may correspond to a priority level of the UE 115-*a* or of the data transmission 210 for the UE 115-*a*. If the UE 115-*a* is associated with a relatively higher priority level, the UE 115-*a* may transmit the energy pattern 205 with a relatively higher transmit power, a relatively longer transmit duration, or both to actively protect the data transmission 210. In some such aspects, the UE 115-*a* (e.g., a relatively higher priority UE) may not perform sensing on the channel during the data transmission 210. If the UE 115-*b* is associated with a relatively lower priority level, the UE 115-*b* may perform sensing on the channel to determine if any relatively higher priority devices are using the channel. As such, the UE 115-*b* may detect the energy pattern 205 and determine that a transmission (e.g., the data transmission 210) from a higher priority device (e.g., the UE 115-*a*) is occupying the channel. Accordingly, the UE 115-*b* may modify (e.g., delay) one or more transmissions on the channel based on detecting the energy pattern 205 or may switch to transmit on a different channel.

In some aspects, the UE 115-*a* and the UE 115-*b* may be associated with the same priority level. In some such aspects, the UE 115-*b* may transmit a similar or the same energy pattern 205 for a same priority transmission. In one aspect, if the UE 115-*b* detects the energy pattern 205 from the UE 115-*a*, the UE 115-*b* may compare the energy pattern 205 to an energy detection threshold, but may not modify (e.g., turn off) scheduled transmissions on the channel based on detecting the energy pattern 205. That is, the UE 115-*b* may continue operating on the channel after detecting the energy pattern 205. In some aspects, the UE 115-*a* may refrain from monitoring the channel for energy patterns associated with the same priority level as the UE 115-*a* while transmitting the data transmission 210. Thus, even if UE

115-*a* is transmitting a transmission including energy pattern 205 (e.g., at one or more periodic intervals), UE 115-*b* may also begin transmitting on the channel without monitoring during time periods for the energy pattern 205.

Compared to wireless communications systems in which the wireless devices may transmit on the channel without consideration of other systems operating on the channel, the wireless communications system 200 may enable the UE 115-*a* to transmit the data transmission 210 on the channel with less interference, improved reliability, and greater efficiency based on using the energy pattern 205 to notify the UE 115-*b* of the data transmission 210. Accordingly, the UE 115-*b* may temporarily backoff from the channel, reducing the likelihood of transmissions from the UE 115-*b* colliding with the data transmission 210.

Figure 3:
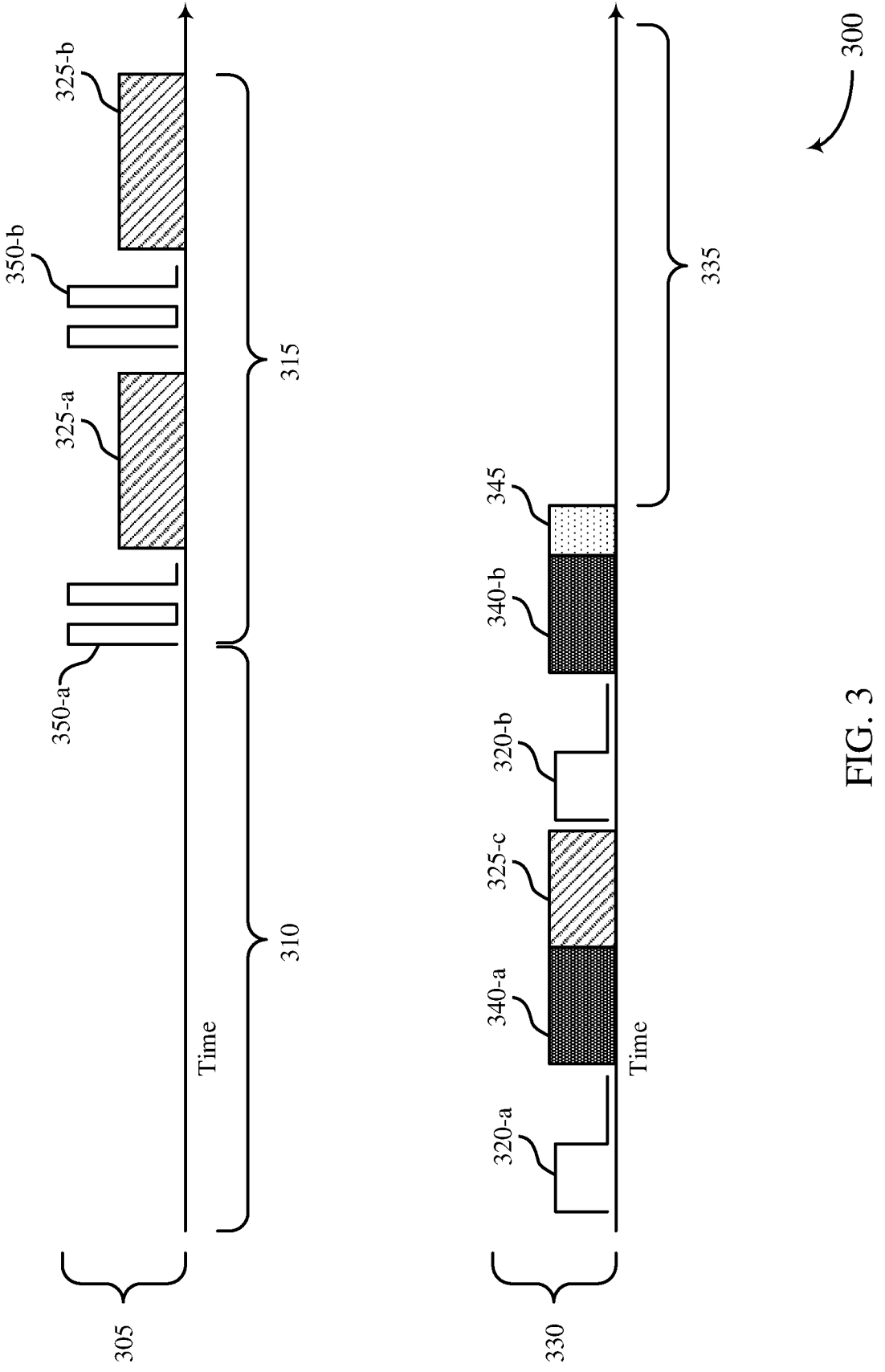
FIG. 3 illustrates an aspect of a transmission schedule that supports energy pattern-based DFS for high-band spectrum sharing in accordance with aspects of the present disclosure.

FIG. 3 illustrates an aspect of a transmission schedule 300 that supports energy pattern-based DFS for high-band spectrum sharing in accordance with aspects of the present disclosure. The transmission schedule 300 may be implemented by aspects of the wireless communications systems 100 and 200. In one aspect, the transmission schedule 300 may be implemented by a UE 115 or a base station 105, which may be aspects of corresponding devices described herein with reference to FIGS. 1 and 2. In accordance with the transmission schedule 300, a first wireless device (e.g., a UE 115 or a base station 105, including, in some cases, a STA or an AP) associated with a first system 305 may transmit an energy pattern 350-*a* on a channel in an unlicensed band. A second wireless device (e.g., a UE 115 or a base station 105, including, in some cases, a STA or an AP) associated with a second system 330 may detect the energy pattern 350-*a* during a sensing duration 340-*b* and may refrain from transmitting on the channel for a non-occupancy period 335 based on detecting the energy pattern 350-*a*. As a result, the first wireless device may transmit one or more data transmissions 325 on the channel with higher reliability (e.g., compared to transmitting the one or more data transmissions 325 while the second wireless device is also transmitting on the channel).

The second wireless device may transmit energy patterns 320 on a channel in an unlicensed band while operating in the unlicensed band. The second wireless device may transmit the energy patterns 320 with specific energy states, specific energy levels, or both based on a RAT associated with the second wireless device, a priority level associated with the second wireless device, or both. In some aspects, the second wireless device may be associated with a relatively lower priority system (e.g., the second system 330) and may transmit the energy patterns 320 with a transmit power (e.g., $P_2$) and a transmit duration (e.g., $T_2$) that correspond to the relatively lower priority system. In some aspects, the second wireless device may periodically transmit the energy patterns 320 on the channel. In one aspect, the second wireless device may transmit an energy pattern 320-*a* at a first time and may transmit an energy pattern 320-*b* at a second time, where the first and second times are separated by a periodic time interval.

The second wireless device may monitor the channel during a sensing duration 340-*a*, which may include multiple periodic energy detection intervals, before transmitting the data transmission 325-*c* on the channel. During the sensing duration 340-*a*, the second wireless device may monitor the channel for energy patterns from other wireless devices operating on the channel. In one aspect, if the first wireless device is in a silent duration 310, the first wireless device may not transmit energy patterns or data transmissions on the channel. As such, the second wireless device may not detect any energy patterns from the first wireless device in the sensing duration 340-*a*. Accordingly, the second wireless device may transmit the data transmission 325-*c* on the channel. After transmitting the data transmission 325-*c*, the second wireless device may transmit a second energy pattern 320-*b* on the channel and may monitor the channel during a second sensing duration 340-*b* before transmitting another data transmission on the channel.

In some aspects, after the silent duration 310, the first wireless device may transmit an energy pattern 350-*a* on the channel prior to transmitting a data transmission 325-*a*. The first wireless device may transmit the energy pattern 350-*a* with specific energy states, energy levels, or both based on a RAT associated with the first wireless device, a priority level associated with the first wireless device, or both. In some aspects, if the first wireless device is associated with a relatively higher priority system (e.g., the first system 305), the first wireless device may transmit the energy pattern 350-*a* with a relatively higher transmit power (e.g., P), a relatively longer transmit duration (e.g., 7), or both in comparison to the energy pattern 320-*a* of the second wireless device. That is, the energy pattern 320-*a* may have a lower transmit power than the energy pattern 350-*a* (e.g., $P_2<P$), a shorter transmit duration than the energy pattern 350-*a* (e.g., $T_2<T$), or both. Additionally or alternatively, if the first wireless device is associated with a relatively higher priority system (e.g., the first system 305), the first wireless device may refrain from sensing for energy patterns on the channel prior to transmission (e.g., if the data transmission 325-*a* is a highest priority transmission on the channel).

The second wireless device may detect the energy pattern 350-*a* from the first wireless device during the second sensing duration 340-*b* and may determine that the energy pattern 350-*a* corresponds to a relatively higher priority device or transmission (e.g., based on one or more of the transmit power, the transmit duration, the energy states, or the energy levels of the energy pattern 350-*a*). As such, the second wireless device may modify (e.g., delay) a transmission on the channel based on detecting the energy pattern 350-*a*. More specifically, the second wireless device may stop transmitting on the channel within a time period 345 and may refrain from transmitting other messages on the channel for a non-occupancy period 335.

After transmitting the energy pattern 350-*a*, the first wireless device may transmit the data transmission 325-*a* on the channel during a transmission period 315. As a result of transmitting the energy pattern 350-*a* prior to the data transmission 325-*a*, transmissions from the second wireless device may not interfere with the data transmission 325-*a*. In some aspects, the first wireless device may transmit an energy pattern 350-*b* on the channel based on a periodicity for energy pattern signaling, a second data transmission 325-*b* to transmit on the channel, completing the data transmission 325-*a*, or some combination thereof. In turn, the first wireless device may transmit a data transmission 325-*b* on the channel based on transmitting the energy pattern 350-*b*. In some aspects, the data transmission 325-*a* may correspond to a first portion of a message transmitted on the channel and the data transmission 325-*b* may correspond to a second portion of the message transmitted on the channel. The first wireless device may transmit the data transmissions 325 on the channel with decreased interference, higher reliability, and greater efficiency (e.g., in comparison to transmitting the data transmissions 325 on the channel while the second wireless device is also transmitting on the channel) based on using the energy patterns 350 to decrease the likelihood of collisions between transmissions from the second wireless device and transmissions from the first wireless device.

Figures 4A, 4B, 4C:
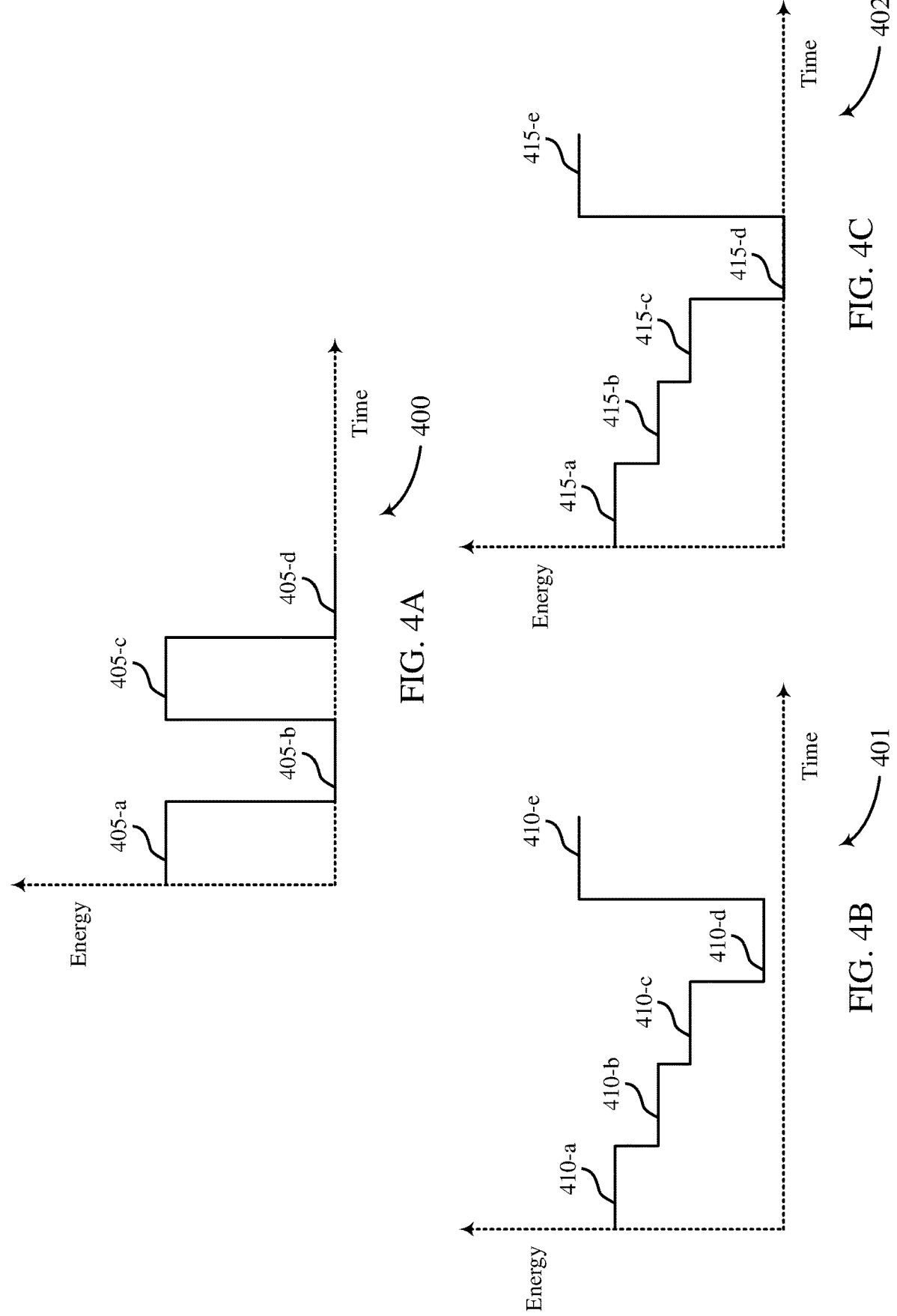
FIGS. 4A-4C illustrate aspects of energy patterns that support energy pattern-based DFS for high-band spectrum sharing in accordance with aspects of the present disclosure.

FIGS. 4A, 4B, and 4C illustrate aspects of an energy pattern 400, an energy pattern 401, and an energy pattern 402, respectively, that support energy pattern-based DFS for high-band spectrum sharing in accordance with aspects of the present disclosure. The energy patterns 400, 401, and 402 may be implemented by aspects of the wireless communications systems 100 and 200. In one aspect, the energy patterns 400, 401, and 402 may be implemented by a UE 115 or a base station 105, which may be aspects of corresponding devices described herein with reference to FIGS. 1 and 2. In some aspects, a first wireless device (e.g., a UE 115 or a base station 105) may transmit an energy pattern (e.g., the energy pattern 400, the energy pattern 401, the energy pattern 402, or a combination thereof) to a second wireless device (e.g., a UE 115 or a base station 105) over a channel in an unlicensed spectrum, as described with reference to FIG. 3. The second wireless device may refrain from transmitting on the channel for a non-occupancy period based on receiving the energy pattern. The first wireless device may transmit a data communication to a third wireless device (e.g., a base station 105 or a UE 115) on the channel based on transmitting the energy pattern, failing to detect another device's energy pattern on the channel, or both.

The energy pattern 400 may include energy levels 405 that correspond to on and off states. In one aspect, the energy pattern 400 may include energy levels 405-*a* and 405-*c* that correspond to an on state and energy levels 405-*b* and 405-*d* that correspond to an off state. Such a combination of on and off states may be referred to as an on-off pattern. Although illustrated with an on-off pattern, it is to be understood that the energy pattern 400 may include any number of patterns (e.g., an on-on-off-off pattern, an on-off-off pattern, an on-on-off pattern) based on changing the states of the energy levels 405. In addition, the energy pattern 400 may include any number of sub-intervals, such as less than or more than the four sub-intervals shown in FIG. 4A.

In some aspects, a wireless device may transmit the energy pattern 400 based on one or more characteristics of the wireless device. In one aspect, the wireless device may transmit the energy pattern 400 with the energy levels 405-*a*, 405-*b*, 405-*c*, and 405-*d* based on a RAT associated with the wireless device, a priority level associated with the wireless device or an upcoming transmission of the wireless device, or both. The energy levels 405-*a*, 405-*b*, 405-*c*, and 405-*d* may indicate, to other wireless devices monitoring the channel, that the wireless device is transmitting (or is scheduled to transmit) one or more messages on the channel. In some aspects, a wireless device may transmit an energy pattern with a specific transmit power, a specific transmit duration, or both corresponding to the RAT of the wireless device, the priority level of the wireless device, or both.

The energy pattern 401 may include energy levels 410-*a*, 410-*b*, 410-*c*, 410-*d*, and 410-*e*, which may correspond to different magnitudes. In some aspects, the energy level 410-*d* may correspond to a lowest magnitude of the energy pattern 401 and the energy level 410-*e* may correspond to a highest magnitude of the energy pattern 401. Although illustrated with specific magnitudes, it is to be understood that the energy pattern 401 may include any number of energy levels 410 corresponding to any number of different magnitudes.

In some aspects, a wireless device may transmit the energy pattern 401 based on one or more characteristics associated with the wireless device. More specifically, the wireless device may transmit the energy pattern 401 with the energy levels 410-a, 410-b, 410-c, 410-d, and 410-e based on a RAT associated with the wireless device, a priority level associated with the wireless device, or both. The energy levels 410-a, 410-b, 410-c, 410-d, and 410-e may indicate, to other wireless devices monitoring the channel, that the wireless device is transmitting (or is scheduled to transmit) one or more messages on the channel and that the transmission is associated with the RAT, the priority level, or both. The energy pattern 401 may include any number of sub-intervals of varying energy levels, where the energy pattern 401 includes at least two or at least three energy levels that are different from each other. The energy pattern 401 may include at least one sub-interval having a reference energy level. That is, there may be multiple energy patterns 401 associated with different RATs or priority levels, where each energy pattern includes at least one sub-interval of a same energy level. In one aspect, each energy pattern 401 may have a same sub-interval (e.g., the first sub-interval of the energy pattern 401) of a reference energy level (e.g., highest energy level of the energy pattern 401). That is, the wireless device may encode information in the different magnitudes of the energy levels 410 to indicate one or more character-istics of the wireless device transmitting the energy pattern 401.

The energy pattern 402 may include one or more energy levels 415 that correspond to on and off states, magnitudes, or both. That is, the energy pattern 402 may be encoded with state information, magnitude information, or both. In one aspect, the energy level 415-d may correspond to an off state, whereas energy levels 415-a, 415-b, 415-c, and 415-e may correspond to different magnitudes. Although illus-trated with a specific combination of energy levels 415 corresponding to on-off states and magnitudes, it is to be understood that the energy pattern 402 may include any number of energy levels 415 associated with any combina-tion of states, magnitudes, or both. Similar to energy pattern 401, the energy pattern 402 may include any number of sub-intervals of varying energy levels, where the energy pattern 402 may include at least two or at least three energy levels that are different from each other. The energy pattern 402 may also include at least one sub-interval having a zero energy state.

In some aspects, a wireless device may transmit the energy pattern 402 based on one or more characteristics associated with the wireless device. In one aspect, the wireless device may transmit the energy pattern 402 with the energy levels 415-a, 415-b, 415-c, 415-d, and 415-e based on a RAT associated with the wireless device, a priority level associated with the wireless device, or both. The energy levels 415-a, 415-b, 415-c, 415-d, and 415-e may indicate, to other wireless devices monitoring the channel, that the wireless device is transmitting (or is scheduled to transmit) one or more messages on the channel, as well as indicating the RAT, the priority level, or both associated with the transmission. In some aspects, the wireless device may transmit the energy pattern 402 with a configurable transmit power and a configurable transmit duration (e.g., based on the RAT, the priority level, or both) before transmitting the one or more messages (e.g., data transmissions) on the channel.

Figure 5:
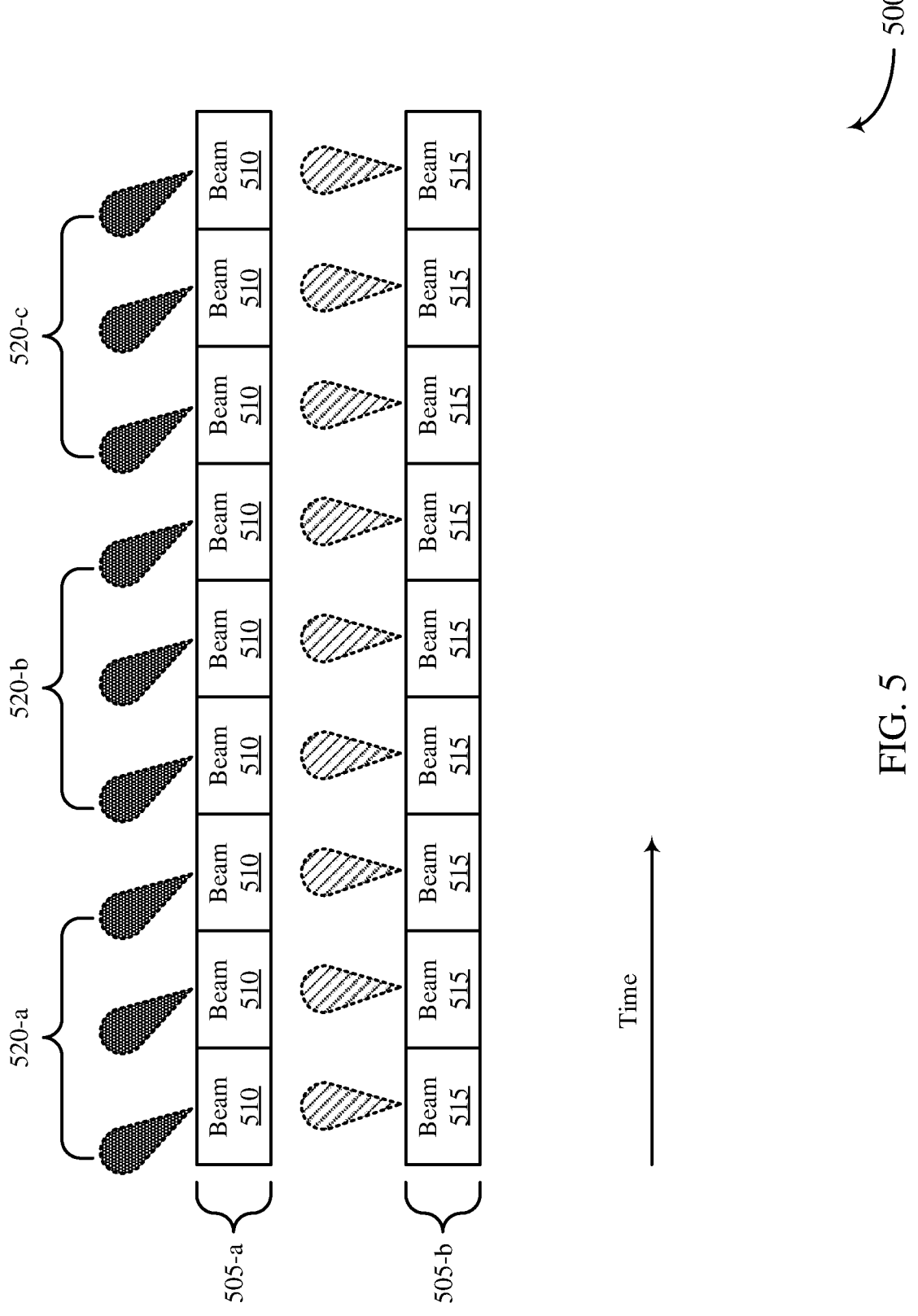
FIGS. 5 and 6 illustrate aspects of beam configurations that support energy pattern-based DFS for high-band spectrum sharing in accordance with aspects of the present disclosure.

FIG. 5 illustrates an aspect of a beam configuration 500 that supports energy pattern-based DFS for high-band spec-trum sharing in accordance with aspects of the present disclosure. The beam configuration 500 may be imple-mented by aspects of the wireless communications systems 100 and 200. In one aspect, the beam configuration 500 may be implemented by a UE 115 or a base station 105, which may be aspects of corresponding devices described herein with reference to FIGS. 1 and 2. In some aspects, a first wireless device (e.g., a UE 115 or a base station 105) associated with a first system 505-a may transmit an energy pattern on a channel in an unlicensed band and a second wireless device (e.g., a UE 115 or a base station 105) associated with a second system 505-b may modify timing for one or more transmissions on the channel based on detecting the energy pattern. In some cases, the first wireless device may transmit multiple repetitions 520 of the energy pattern via a transmit beam 510 and the second wireless device may detect at least one of the multiple repetitions 520 of the energy pattern via a receive beam 515. In comparison to transmitting a single energy pattern, the first wireless device transmitting multiple repetitions 520 of the energy pattern may enable the second wireless device to detect the energy pattern with greater reliability.

In some aspects, the first and second wireless devices may communicate on a channel in an unlicensed band. In one aspect, the first wireless device may transmit one or more messages associated with a first system 505-a on the channel via the transmit beam 510 and the second wireless device may receive one or more messages associated with a second system 505-b on the channel via the receive beam 515. In accordance with the techniques described herein, the first wireless device may transmit an energy pattern on the channel via the transmit beam 510. The energy pattern may indicate that the first wireless device is transmitting (or intends to transmit) one or more messages on the channel (e.g., using the transmit beam 510 or a transmit beam with a relatively similar beam direction, beam width, or both). In some aspects, the transmit beam 510 may correspond to a transmit beam that the first wireless device is scheduled to use for transmitting the one or more messages. The second wireless device may monitor the channel for a sensing duration (e.g., a sensing duration 340-a as described with reference to FIG. 3) using the receive beam 515. In some aspects, the second wireless device may detect the energy pattern from the first wireless device and may modify (e.g., delay) a scheduled transmission on the channel based on detecting the energy pattern. The scheduled transmission may use a transmit beam corresponding to the receive beam 515 (e.g., with a relatively similar beam direction, beam width, or both).

In some aspects, to increase a likelihood of the second wireless device detecting the energy pattern via the receive beam 515, the first wireless device may transmit multiple repetitions 520 of the energy pattern on the channel via the transmit beam 510. In one aspect, the first wireless device may transmit a first repetition 520-a of the energy pattern, a second repetition 520-b of the energy pattern, and a third repetition 520-c of the energy pattern via the transmit beam 510, where each repetition of the energy pattern may include at least two or at least three sub-intervals (e.g., correspond-ing to on-off states, energy level states, or a combination thereof) transmitted (or a null transmission if corresponding to an off state) on the transmit beam 510. That is, the first wireless device may repeat the energy pattern multiple times on the transmit beam 510. Transmitting multiple repetitions 520 of the energy pattern may cause measurements of the energy pattern to accumulate at the receiving device (e.g., over the receive beam 515). Such accumulation may enable the second wireless device to reliably detect the energy pattern.

In some aspects, the sensing duration of the second wireless device may not align with a transmit duration of the first wireless device (e.g., a transmit duration for the energy pattern). In one aspect, the first system 505-a (e.g., NR) may not be synchronized in the time domain with the second system 505-b (e.g., WiFi). As such, symbols, slots, or other TTIs for the different systems 505 may not align in time and, accordingly, the first wireless device may not be able to determine when the second wireless device is measuring for the energy pattern. To improve the likelihood of the second wireless device successfully detecting the energy pattern, the second wireless device may alter (e.g., extend) the sensing duration such that a relationship between the sensing duration and the receive beam 515 (e.g., a sensing duration per-beam metric) is equivalent to a multiple of the transmit duration (e.g., N-times a length of the energy pattern). Accordingly, if the timing is misaligned between the first system 505-a and the second system 505-b, the extended sensing duration of the second wireless device may ensure that the second wireless device is monitoring the channel when the first wireless device is transmitting at least a portion of the energy pattern repetitions. Similarly, the number of transmitted energy pattern repetitions by the first wireless device may ensure that the second wireless device may detect the energy pattern, despite a potential timing misalignment between unsynchronized systems 505.

Figure 6:
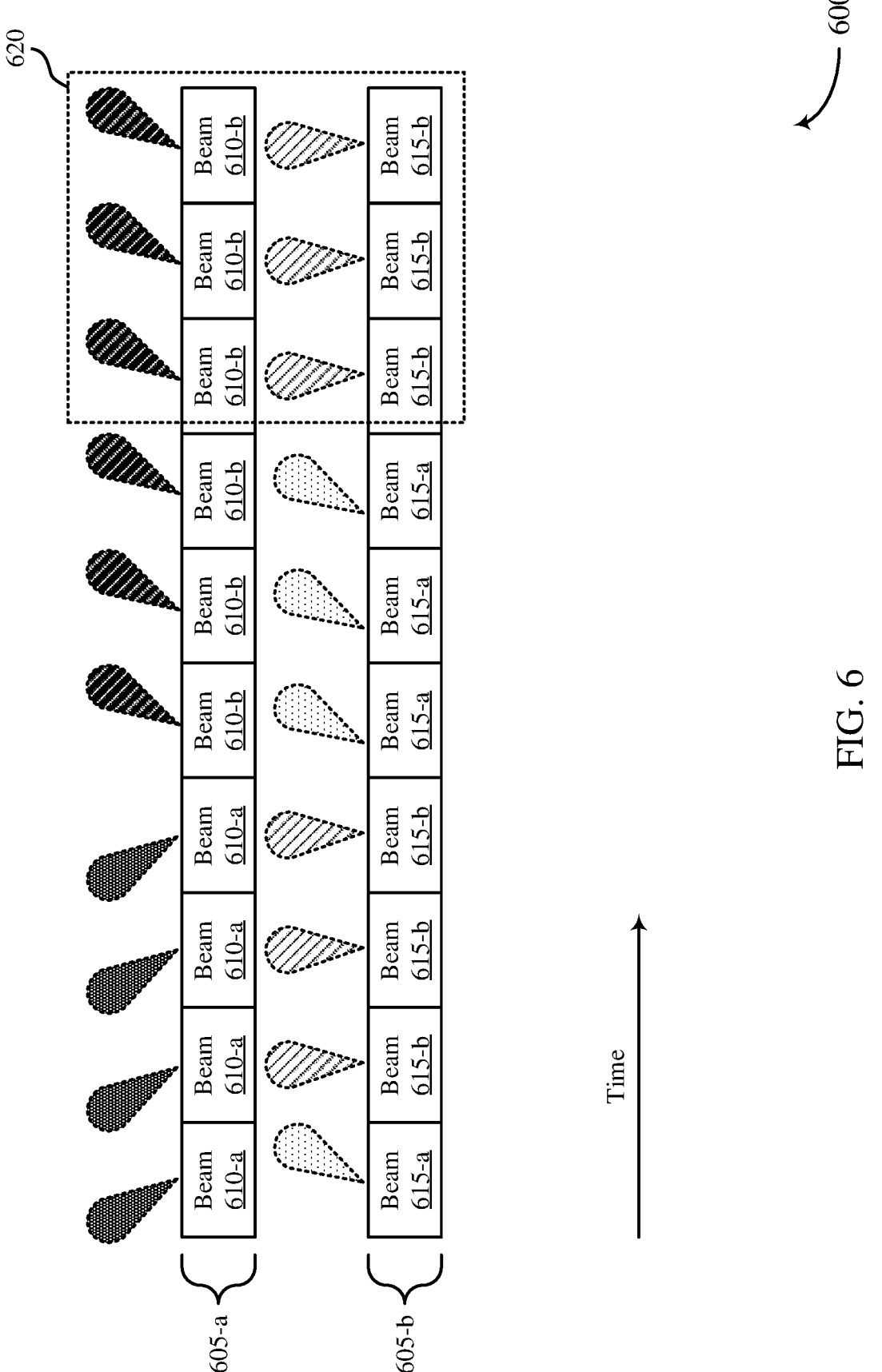

FIG. 6 illustrates an aspect of a beam configuration 600 that supports energy pattern-based DFS for high-band spectrum sharing in accordance with aspects of the present disclosure. The beam configuration 600 may be implemented by aspects of the wireless communications systems 100 and 200. In one aspect, the beam configuration 600 may be implemented by a UE 115 or a base station 105, which may be aspects of corresponding devices described herein with reference to FIGS. 1 and 2. In some aspects, a first wireless device (e.g., a UE 115 or a base station 105) associated with a first system 605-a may transmit an energy pattern on a channel in an unlicensed band and a second wireless device (e.g., a UE 115 or a base station 105) associated with a second system 605-b may modify (e.g., delay) a scheduled transmission on the channel based on detecting the energy pattern. In some cases, the first wireless device may transmit the energy pattern via multiple transmit beams 610 and the second wireless device may detect the energy pattern on at least one receive beam 615. In comparison to transmitting the energy pattern via a single transmit beam 610, the first wireless device transmitting the energy pattern via multiple transmit beams 610 may enable the second wireless device to detect the energy pattern with greater reliability (e.g., due to the greater directional diversity supported by multiple transmit beams 610 as compared to a single transmit beam 610).

In some aspects, the first and second wireless devices may communicate on a channel in an unlicensed band. In one aspect, the first wireless device may transmit one or more messages associated with a first system 605-a on the channel via a transmit beam 610-a and a transmit beam 610-b. Likewise, the second wireless device may receive one or more messages associated with a second system 605-b on the channel via a receive beam 615-a and a receive beam 615-b.

In some aspects, to increase the likelihood of the second wireless device detecting an energy pattern, the first wireless device may transmit multiple repetitions of the energy pattern as described with reference to FIG. 5. Additionally or alternatively, the first wireless device may increase the likelihood of the second wireless device detecting the energy pattern based on transmitting the energy pattern over multiple transmit beams 610. That is, the first wireless device may transmit the energy pattern over both the transmit beam 610-a and the transmit beam 610-b. Transmitting the energy pattern over multiple transmit beams 610 may increase the likelihood of obtaining alignment (e.g., directional and temporal alignment) between a transmit beam 610 of the first wireless device (e.g., the transmit beam 610-b) and a receive beam 615 of the second wireless device (e.g., the receive beam 615-b).

In one aspect, the first wireless device may transmit an energy pattern on the channel with a transmit duration and the second wireless device may monitor the channel during a sensing duration. In some aspects, the transmit duration of the energy pattern may not align with the sensing duration of the second wireless device. To mitigate such time misalignment, the first wireless device may transmit multiple repetitions of the energy pattern via the transmit beams 610.

In another aspect, some of the transmit beams 610 may not directionally align with some of the receive beams 615. More specifically, the transmit beam 610-a may not align with the receive beam 615-a or the receive beam 615-b and the transmit beam 610-b may not align with the receive beam 615-a. The first wireless device may also be unable to determine which transmit beams 610 align with which receive beams 615. To mitigate such directional misalignment, the first wireless device may transmit multiple repetitions of the energy pattern over each of the transmit beams 610. The transmit beams 610 may correspond to beams scheduled for transmission for one or more messages from the first wireless device. Additionally, the second wireless device may perform multiple repetitions of channel sensing using the receive beams 615. The receive beams 615 may correspond to beams scheduled for transmission by the second wireless device, or may correspond to conjugate beams (e.g., in an opposite direction to the beams scheduled for transmission by the second wireless device. The first wireless device and the second wireless device may be configured with different beam switching patterns, such that different beam pairs are used at different times by the first and second wireless devices. In some cases, the beam switching patterns may be based on the RATs, priority levels, or both for the wireless devices.

In some aspects, the first and second wireless devices may experience a period of alignment 620 between the transmit beam 610-b of the first wireless device and the receive beam 615-b of the second wireless device based on the first wireless device transmitting multiple repetitions of the energy pattern over each transmit beam 610 and the beam switching patterns of the wireless devices. During the period of alignment 620, the second wireless device may have an increased likelihood of successfully detecting the energy pattern from the first wireless device (e.g., based on the direction of the transmit beam 610-b corresponding to the direction of the receive beam 615-b).

Figure 7:
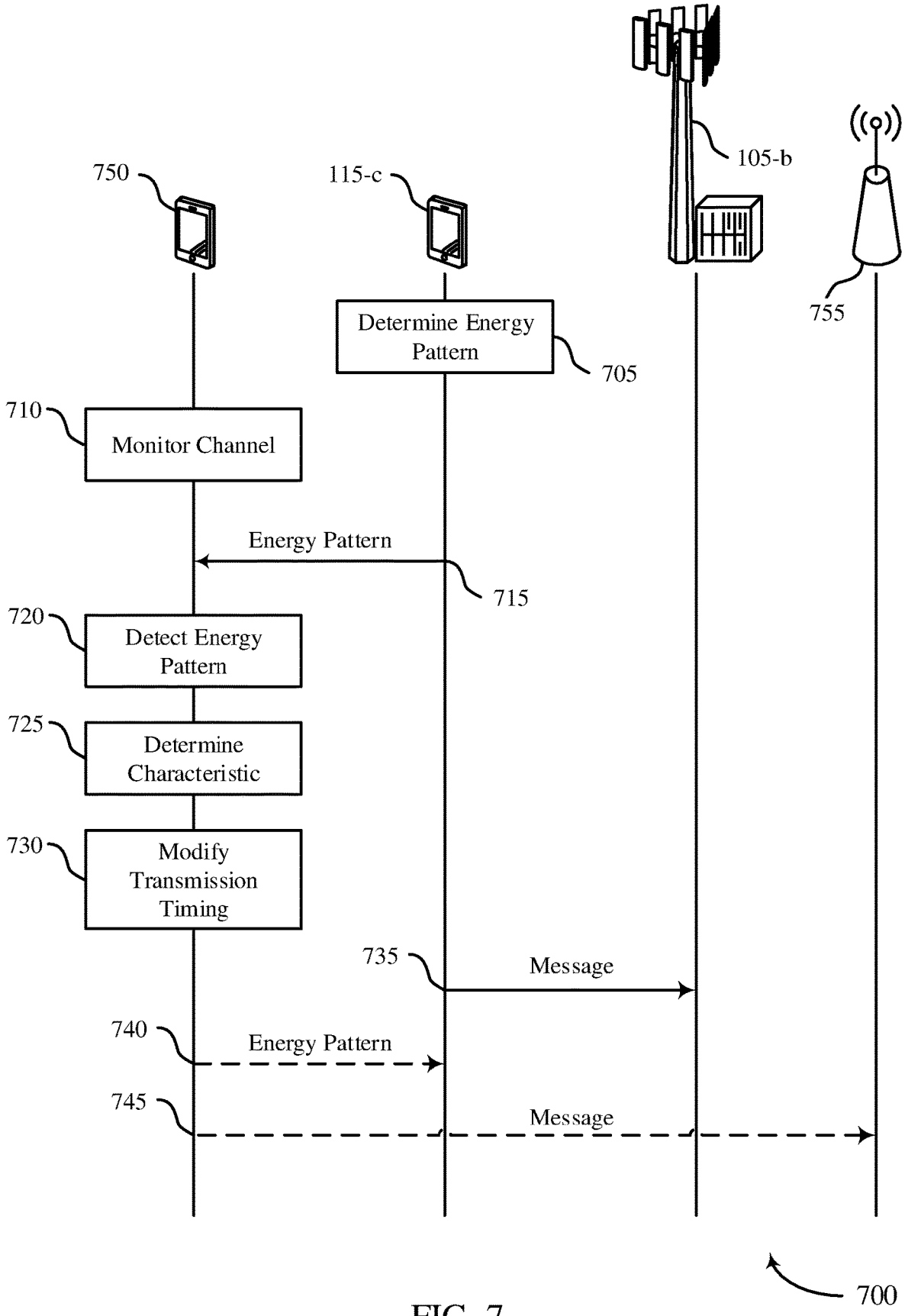
FIG. 7 illustrates an aspect of a process flow that supports energy pattern-based DFS for high-band spectrum sharing in accordance with aspects of the present disclosure.

FIG. 7 illustrates an aspect of a process flow 700 that supports energy pattern-based DFS for high-band spectrum sharing in accordance with aspects of the present disclosure. The process flow 700 may implement aspects of the wireless communications systems 100 and 200. In one aspect, the process flow 700 illustrates communications between wireless devices (e.g., a STA 750, an AP 755, a UE 115-c, and a base station 105-b), which may be aspects of corresponding devices described herein. In some aspects, the UE 115-c may transmit an energy pattern on a channel, and the STA 750 may modify timing for transmission of a message on the channel based on receiving the energy pattern from the UE 115-c. Additionally, alternative aspects of the following may be implemented where some operations may be performed in a different order than described or are not performed at all. In some aspects, operations may include additional features not mentioned below, or further processes or communications may be added.

At 705, the UE 115-*c* may determine an energy pattern corresponding to a characteristic of the UE 115-*c*. The energy pattern may include at least two sub-periods of different energy levels. In some aspects, the UE 115-*c* may determine an on-off pattern for the energy pattern, an energy level pattern for the energy pattern, a transmit power for the energy pattern, a transmit duration for the energy pattern, or a combination thereof based on the characteristic of the UE 115-*c*. The characteristic of the UE 115-*c* may include a RAT associated with the UE 115-*c*, a priority level of the UE 115-*c*, or both. In some cases, the UE 115-*c* may sense an amount of traffic on the channel and may determine the priority level for the UE 115-*c* based on the amount of traffic on the channel. In some cases, the priority level of the UE 115-*c* may be semi-static (e.g., based on the RAT for the UE 115-*c*) or dynamic (e.g., based on channel conditions, the type of message for transmission by the UE 115-*c*, or both).

At 710, the STA 750 may monitor the channel during multiple periodic energy detection intervals. In some aspects, the channel may correspond to a shared mmW band. The STA 750 may monitor the channel according to a sensing duration that corresponds with a second RAT, a second priority level, or both associated with the STA 750. In some aspects, the STA 750 may monitor the channel using a beam sweep procedure for multiple communication beams. In some cases, the STA 750 may use each communication beam of the multiple communication beams to sense the channel for a beam-specific sensing duration.

At 715, the UE 115-*c* may transmit the energy pattern on the channel before transmitting multiple portions of a message on the channel. In some aspects, the UE 115-*c* may transmit the energy pattern with an energy level pattern, an on-off pattern, a transmit power, a transmit duration, or a combination thereof based on the characteristic of the UE 115-*c* as determined at 705. In some cases, the UE 115-*c* may perform a beam sweep procedure for multiple communication beams and may transmit the energy pattern on each communication beam of the multiple communication beams based on the beam sweep procedure. Additionally or alternatively, the UE 115-*c* may transmit multiple repetitions of the energy pattern on at least one communication beam of the multiple communication beams as described with reference to FIG. 5. In some aspects, the UE 115-*c* may periodically transmit the energy pattern on the channel based on a frequency value that corresponds to the characteristic of the UE 115-*c*.

At 720, the STA 750 may detect the energy pattern on the channel based on monitoring the channel during the multiple periodic energy detection intervals. At 725, the STA 750 may determine the characteristic corresponding to the energy pattern. The characteristic may be associated with (e.g., configured for) the UE 115-*c*. In some aspects, the STA 750 may determine the characteristic based on determining two or more energy levels associated with the energy pattern. Additionally or alternatively, the STA 750 may determine the characteristic based on a difference between a first power level of the energy pattern and a second power level of the energy pattern, a transmit duration of the energy pattern, or both. In some aspects, if the characteristic includes the RAT associated with the UE 115-*c*, the STA 750 may determine that the RAT associated with the UE 115-*c* has a priority over the second RAT associated with the STA 750. In some other aspects, if the characteristic includes the priority level associated with the UE 115-*c*, the STA 750 may determine that the priority level associated with the UE 115-*c* is greater than the second priority level associated with the STA 750.

At 730, the STA 750 may modify timing for transmission of a second message on the channel based on determining the characteristic associated with the UE 115-*c*. In some aspects, the STA 750 may delay the timing for transmission of at least a portion of the second message on the channel based on a non-occupancy period for the channel, a determination that the RAT associated with the UE 115-*c* has priority over the second RAT associated with the STA 750, a determination that the priority level associated with the UE 115-*c* is greater than the second priority level associated with the STA 750, or a combination thereof.

At 735, the UE 115-*c* may transmit the multiple portions of the message (e.g., to a base station 105-*b*) on the channel based on transmitting the energy pattern on the channel. In some aspects, the STA 750 may transmit a second energy pattern on the channel at 740. The second energy pattern may indicate a characteristic associated with the STA 750. In some cases, the STA 750 may periodically transmit the second energy pattern on the channel based on a frequency value that corresponds to the characteristic of the STA 750. In some aspects, the STA 750 may transmit one or more portions of the second message on the channel at 745 (e.g., to an AP 755).

Although described herein with reference to a UE, a STA, a base station, and an AP, it is to be understood that any combination of wireless devices associated with any combination of systems may perform one or more aspects of the process flow 700.

FIG. 8 shows a block diagram 800 of a device 805 that supports energy pattern-based DFS for high-band spectrum sharing in accordance with aspects of the present disclosure. The device 805 may include aspects of a wireless device (e.g., a UE 115 or a base station 105) as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to energy pattern-based DFS for high-band spectrum sharing). Information may be passed on to other components of the device 805. The receiver 810 may utilize a single antenna or a set of multiple antennas.

The transmitter 815 may provide a means for transmitting signals generated by other components of the device 805. In one aspect, the transmitter 815 may transmit information such as packets, user data, control information, or any combination thereof associated with various information channels (e.g., control channels, data channels, information channels related to energy pattern-based DFS for high-band spectrum sharing). In some aspects, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be aspects of means for performing various aspects of energy pattern-based DFS for high-band spectrum sharing as described herein. In one aspect, the communications manager 820, the receiver 810, the transmitter 815, or various combinations or components thereof may support a method for performing one or more of the functions described herein.

In some aspects, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally or alternatively, in some aspects, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some aspects, the communications manager 820 may be configured to perform various operations (e.g., receiving, monitoring, transmitting) using or otherwise in cooperation with the receiver 810, the transmitter 815, or both. In one aspect, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications implemented by a first wireless device in accordance with aspects as disclosed herein. In one aspect, the communications manager 820 may be configured as or otherwise support a means for monitoring a channel during a set of multiple periodic energy detection intervals. The communications manager 820 may be configured as or otherwise support a means for detecting an energy pattern on the channel based on the monitoring. The communications manager 820 may be configured as or otherwise support a means for determining a characteristic corresponding to the energy pattern and associated with a second wireless device transmitting on the channel. The communications manager 820 may be configured as or otherwise support a means for modifying timing for transmission of a message on the channel based on determining the characteristic associated with the second wireless device transmitting on the channel.

Additionally or alternatively, the communications manager 820 may support wireless communications implemented by a wireless device in accordance with aspects as disclosed herein. In one aspect, the communications manager 820 may be configured as or otherwise support a means for determining an energy pattern corresponding to a characteristic for the wireless device, where the energy pattern includes at least two sub-periods of different energy levels.

The communications manager 820 may be configured as or otherwise support a means for transmitting the energy pattern on a channel prior to transmitting each of a set of multiple portions of a message on the channel. The communications manager 820 may be configured as or otherwise support a means for transmitting the set of multiple portions of the message on the channel based on the transmitting the energy pattern on the channel.

By including or configuring the communications manager 820 in accordance with aspects as described herein, the device 805 (e.g., a processor controlling or otherwise coupled to the receiver 810, the transmitter 815, the communications manager 820, or a combination thereof) may support techniques for more efficient utilization of communication resources based on using energy patterns to promote coexistence of multiple different RATs on a channel in an unlicensed spectrum. In some aspects, transmitting an energy pattern on the channel prior to a data transmission may enable the device 805 to notify other devices of the upcoming data transmission. The other devices may accordingly backoff the channel, reducing the likelihood of interference, collisions, or both on the channel. Reducing the likelihood of interference, collisions, or both may effectively reduce a number of retransmissions performed by the device 805 (e.g., due to the improved channel reliability). As such, the device 805 may decrease the number of times the device 805 ramps up processing power and uses processing resources to handle retransmissions, effectively decreasing the processing overhead at the device 805.

Figure 9:
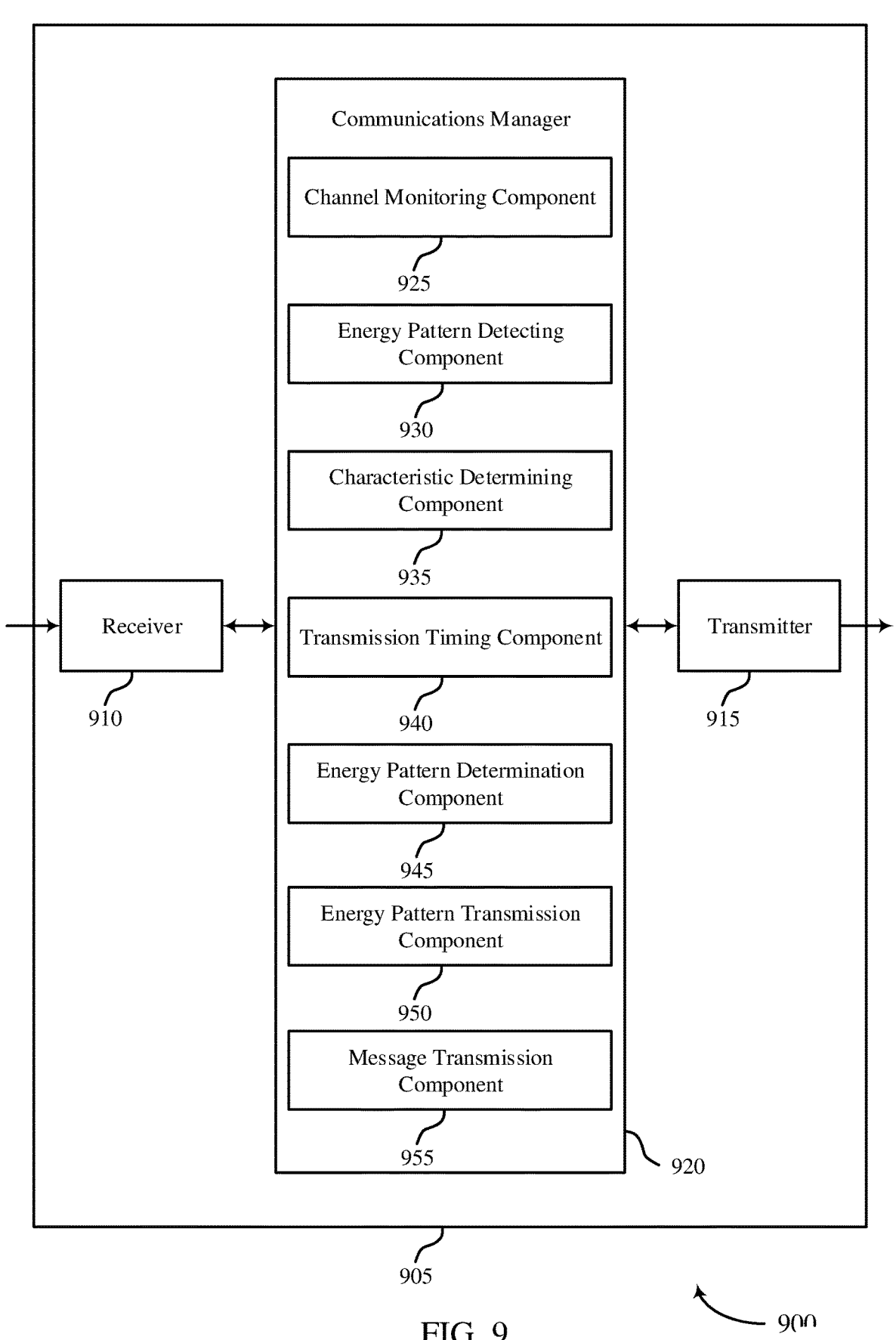

FIG. 9 shows a block diagram 900 of a device 905 that supports energy pattern-based DFS for high-band spectrum sharing in accordance with aspects of the present disclosure. The device 905 may include aspects of a wireless device (e.g., a device 805, a UE 115, or a base station 105) as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to energy pattern-based DFS for high-band spectrum sharing). Information may be passed on to other components of the device 905. The receiver 910 may utilize a single antenna or a set of multiple antennas.

The transmitter 915 may provide a means for transmitting signals generated by other components of the device 905. In one aspect, the transmitter 915 may transmit information such as packets, user data, control information, or any combination thereof associated with various information channels (e.g., control channels, data channels, information channels related to energy pattern-based DFS for high-band spectrum sharing). In some aspects, the transmitter 915 may be co-located with a receiver 910 in a transceiver module. The transmitter 915 may utilize a single antenna or a set of multiple antennas.

The device 905, or various components thereof, may be an aspect of means for performing various aspects of energy pattern-based DFS for high-band spectrum sharing as described herein. In one aspect, the communications manager 920 may include a channel monitoring component 925, an energy pattern detecting component 930, a characteristic determining component 935, a transmission timing component 940, an energy pattern determination component 945, an energy pattern transmission component 950, a message transmission component 955, or any combination thereof. The communications manager 920 may include aspects of a communications manager 820 as described herein. In some aspects, the communications manager 920, or various components thereof, may be configured to perform various operations (e.g., receiving, monitoring, transmitting) using or otherwise in cooperation with the receiver 910, the transmitter 915, or both. In one aspect, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications implemented by a first wireless device in accordance with aspects as disclosed herein. The channel monitoring component 925 may be configured as or otherwise support a means for monitoring a channel during a set of multiple periodic energy detection intervals. The energy pattern detecting component 930 may be configured as or otherwise support a means for detecting an energy pattern on the channel based on the monitoring. The characteristic determining component 935 may be configured as or otherwise support a means for determining a characteristic corresponding to the energy pattern and associated with a second wireless device transmitting on the channel. The transmission timing component 940 may be configured as or otherwise support a means for modifying timing for transmission of a message on the channel based on determining the characteristic associated with the second wireless device transmitting on the channel.

Additionally or alternatively, the communications manager 920 may support wireless communications implemented by a wireless device in accordance with aspects as disclosed herein. The energy pattern determination component 945 may be configured as or otherwise support a means for determining an energy pattern corresponding to a characteristic for the wireless device, where the energy pattern includes at least two sub-periods of different energy levels. The energy pattern transmission component 950 may be configured as or otherwise support a means for transmitting the energy pattern on a channel prior to transmitting each of a set of multiple portions of a message on the channel. The message transmission component 955 may be configured as or otherwise support a means for transmitting the set of multiple portions of the message on the channel based on the transmitting the energy pattern on the channel.

FIG. 10 shows a block diagram 1000 of a communications manager 1020 that supports energy pattern-based DFS for high-band spectrum sharing in accordance with aspects of the present disclosure. The communications manager 1020 may include aspects of a communications manager 820, a communications manager 920, or both, as described herein. The communications manager 1020, or various components thereof, may be an aspect of means for performing various aspects of energy pattern-based DFS for high-band spectrum sharing as described herein. In one aspect, the communications manager 1020 may include a channel monitoring component 1025, an energy pattern detecting component 1030, a characteristic determining component 1035, a transmission timing component 1040, an energy pattern determination component 1045, an energy pattern transmission component 1050, a message transmission component 1055, an energy pattern transmitting component 1060, a transmit power selection component 1065, a pattern duration selection component 1070, a channel traffic component 1075, a priority level determination component 1080, or any combination thereof. Each of these components may communicate, directly or indirectly, with one another (e.g., via one or more buses).

The communications manager 1020 may support wireless communications implemented by a first wireless device in accordance with aspects as disclosed herein. The channel monitoring component 1025 may be configured as or otherwise support a means for monitoring a channel during a set of multiple periodic energy detection intervals. The energy pattern detecting component 1030 may be configured as or otherwise support a means for detecting an energy pattern on the channel based on the monitoring. The characteristic determining component 1035 may be configured as or otherwise support a means for determining a characteristic corresponding to the energy pattern and associated with a second wireless device transmitting on the channel. The transmission timing component 1040 may be configured as or otherwise support a means for modifying timing for transmission of a message on the channel based on determining the characteristic associated with the second wireless device transmitting on the channel.

In some aspects, to support determining the characteristic, the characteristic determining component 1035 may be configured as or otherwise support a means for determining two or more energy levels associated with the energy pattern, where determining the characteristic corresponding to the energy pattern is based on determining the two or more energy levels associated with the energy pattern.

In some aspects, to support determining the characteristic, the characteristic determining component 1035 may be configured as or otherwise support a means for determining the characteristic corresponding to the energy pattern based on a difference between a first power level and a second power level for the energy pattern, a duration of the energy pattern, or both.

In some aspects, the characteristic includes a RAT associated with the second wireless device, and the characteristic determining component 1035 may be configured as or otherwise support a means for determining that the RAT associated with the second wireless device has priority over a second RAT associated with the first wireless device, where modifying the timing for the transmission of the message on the channel includes delaying the timing for transmission of at least a portion of the message on the channel based on a non-occupancy period for the channel and the RAT associated with the second wireless device having priority over the second RAT associated with the first wireless device.

In some aspects, the characteristic includes a priority level associated with the second wireless device, and the characteristic determining component 1035 may be configured as or otherwise support a means for determining that the priority level associated with the second wireless device is greater than a second priority level associated with the first wireless device, where modifying the timing for transmission of the message on the channel includes delaying the timing for transmission of at least a portion of the message on the channel based on a non-occupancy period for the channel and the priority level associated with the second wireless device being greater than the second priority level associated with the first wireless device.

In some aspects, to support monitoring the channel, the channel monitoring component 1025 may be configured as or otherwise support a means for monitoring the channel according to a sensing duration corresponding to a second RAT, a second priority level, or both associated with the first wireless device.

In some aspects, to support monitoring the channel, the channel monitoring component 1025 may be configured as or otherwise support a means for performing a beam sweep procedure for a set of multiple communication beams, where the energy pattern is detected on at least one communication beam of the set of multiple communication beams based on the beam sweep procedure.

In some aspects, to support monitoring the channel, the channel monitoring component 1025 may be configured as or otherwise support a means for monitoring the channel using each communication beam of the set of multiple communication beams for a beam-specific sensing duration, where the beam-specific sensing duration is based on a duration of the energy pattern.

In some aspects, the energy pattern transmitting component 1060 may be configured as or otherwise support a means for transmitting a second energy pattern on the channel prior to transmission of one or more portions of the message on the channel, the second energy pattern indicating a second characteristic associated with the first wireless device.

In some aspects, the energy pattern transmitting component 1060 may be configured as or otherwise support a means for periodically transmitting the second energy pattern on the channel based on a frequency value, where the frequency value is based on the characteristic associated with the first wireless device.

In some aspects, the characteristic associated with the second wireless device is configured for the second wireless device, or is based on an amount of traffic on the channel. In some aspects, the channel corresponds to a shared mmW band.

Additionally or alternatively, the communications manager 1020 may support wireless communications implemented by a wireless device in accordance with aspects as disclosed herein. The energy pattern determination component 1045 may be configured as or otherwise support a means for determining an energy pattern corresponding to a characteristic for the wireless device, where the energy pattern includes at least two sub-periods of different energy levels. The energy pattern transmission component 1050 may be configured as or otherwise support a means for transmitting the energy pattern on a channel prior to transmitting each of a set of multiple portions of a message on the channel. The message transmission component 1055 may be configured as or otherwise support a means for transmitting the set of multiple portions of the message on the channel based on the transmitting the energy pattern on the channel.

In some aspects, to support determining the energy pattern, the energy pattern determination component 1045 may be configured as or otherwise support a means for determining an on-off pattern for the energy pattern, an energy level pattern for the energy pattern, or a combination thereof based on the characteristic for the wireless device.

In some aspects, the transmit power selection component 1065 may be configured as or otherwise support a means for selecting a transmit power for the energy pattern based on the characteristic for the wireless device, where the energy pattern is transmitted using the transmit power.

In some aspects, the pattern duration selection component 1070 may be configured as or otherwise support a means for selecting a duration for the energy pattern based on the characteristic for the wireless device, where the energy pattern is transmitted for the duration.

In some aspects, to support transmitting the energy pattern, the energy pattern transmission component 1050 may be configured as or otherwise support a means for performing a beam sweep procedure for a set of multiple communication beams, where the energy pattern is transmitted on each communication beam of the set of multiple communication beams based on the beam sweep procedure.

In some aspects, to support transmitting the energy pattern, the energy pattern transmission component 1050 may be configured as or otherwise support a means for transmitting a set of multiple repetitions of the energy pattern on at least one communication beam of the set of multiple communication beams.

In some aspects, to support transmitting the energy pattern, the energy pattern transmission component 1050 may be configured as or otherwise support a means for periodically transmitting the energy pattern on the channel based on a frequency value, where the frequency value is based on the characteristic for the wireless device.

In some aspects, the characteristic for the wireless device is configured at the wireless device. In some aspects, the characteristic includes a RAT, a priority level, or both. In some aspects, the characteristic includes a priority level of the wireless device, and the channel traffic component 1075 may be configured as or otherwise support a means for sensing an amount of traffic on the channel. In some aspects, the characteristic includes a priority level of the wireless device, and the priority level determination component 1080 may be configured as or otherwise support a means for determining the priority level for the wireless device based on the amount of traffic on the channel. In some aspects, the channel corresponds to a shared mmW band.

Figure 11:
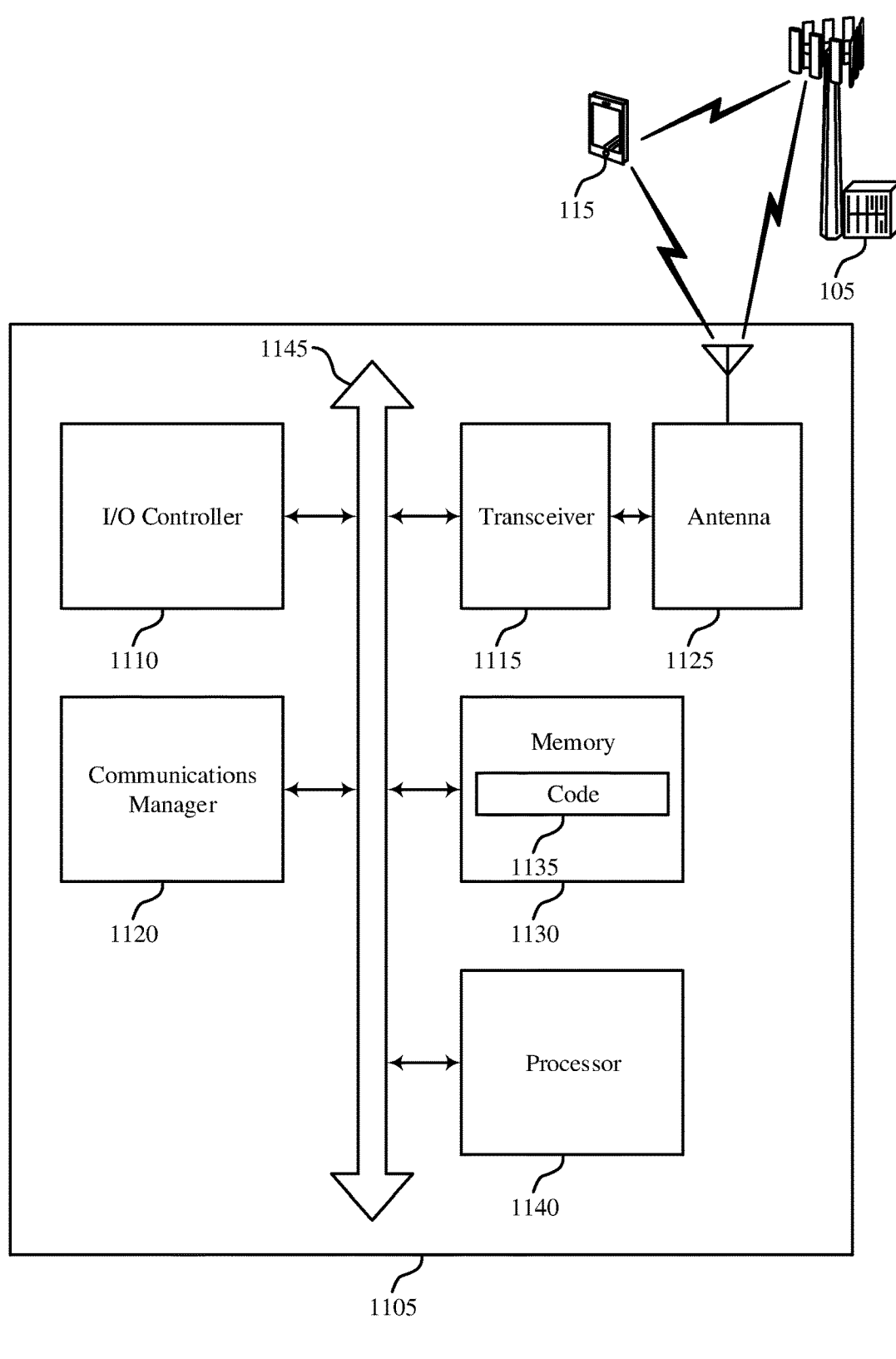
FIG. 11 shows a diagram of a system including a UE that supports energy pattern-based DFS for high-band spectrum sharing in accordance with aspects of the present disclosure.

FIG. 11 shows a diagram of a system 1100 including a device 1105 that supports energy pattern-based DFS for high-band spectrum sharing in accordance with aspects of the present disclosure. The device 1105 may be an aspect of or include the components of a wireless device (e.g., a device 805, a device 905, or a UE 115) as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. In one aspect, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an aspect of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting energy pattern-based DFS for high-band spectrum sharing). In one aspect, the device 1105 or a component of the device 1105 may include a processor 1140 and memory 1130 coupled to the processor 1140, the processor 1140 and memory 1130 configured to perform various functions described herein.

The communications manager 1120 may support wireless communications implemented by a first wireless device in accordance with aspects as disclosed herein. In one aspect, the communications manager 1120 may be configured as or otherwise support a means for monitoring a channel during a set of multiple periodic energy detection intervals. The communications manager 1120 may be configured as or otherwise support a means for detecting an energy pattern on the channel based on the monitoring. The communications manager 1120 may be configured as or otherwise support a means for determining a characteristic corresponding to the energy pattern and associated with a second wireless device transmitting on the channel. The communications manager 1120 may be configured as or otherwise support a means for modifying timing for transmission of a message on the channel based on determining the characteristic associated with the second wireless device transmitting on the channel.

Additionally or alternatively, the communications manager 1120 may support wireless communications implemented by a wireless device in accordance with aspects as disclosed herein. In one aspect, the communications manager 1120 may be configured as or otherwise support a means for determining an energy pattern corresponding to a characteristic for the wireless device, where the energy pattern includes at least two sub-periods of different energy levels. The communications manager 1120 may be configured as or otherwise support a means for transmitting the energy pattern on a channel prior to transmitting each of a set of multiple portions of a message on the channel. The communications manager 1120 may be configured as or otherwise support a means for transmitting the set of multiple portions of the message on the channel based on the transmitting the energy pattern on the channel.

By including or configuring the communications manager 1120 in accordance with aspects as described herein, the device 1105 may support techniques for improved communication reliability based on using energy patterns to promote coexistence of multiple different RATs on a channel in an unlicensed spectrum. In some aspects, transmitting an energy pattern on the channel prior to a data transmission may enable the device 1105 to transmit the data transmission with a decreased likelihood of interference (e.g., based on other wireless devices detecting the energy pattern and backing off the channel during the data transmission).

In some aspects, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some aspects, one or more functions described with reference to the communications manager 1120 may be supported by or performed by the processor 1140, the memory 1130, the code 1135, or any combination thereof. In one aspect, the code 1135 may include instructions executable by the processor 1140 to cause the device 1105 to perform various aspects of energy pattern-based DFS for high-band spectrum sharing as described herein, or the processor 1140 and the memory 1130 may be otherwise configured to perform or support such operations.

Figure 12:
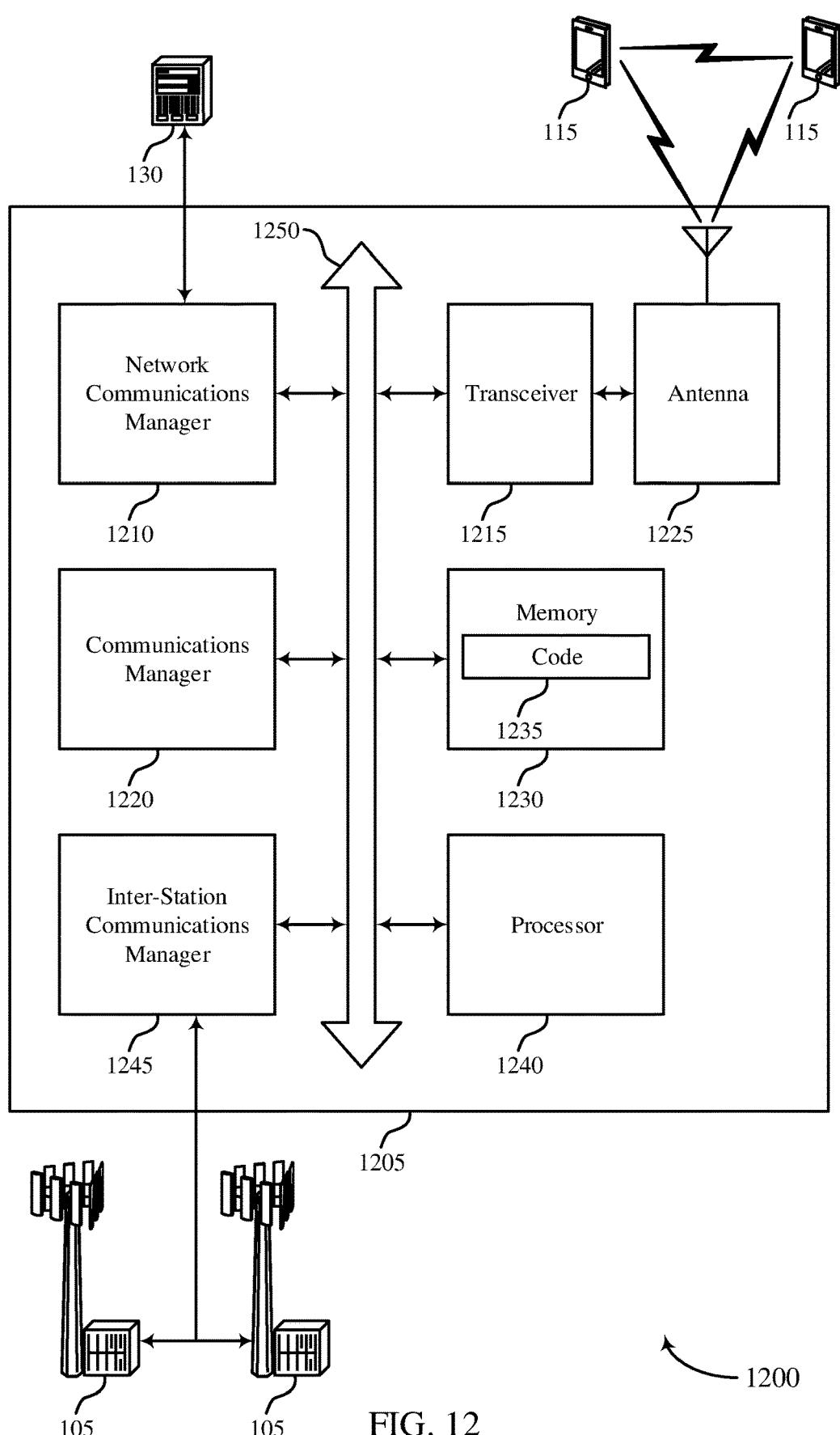
FIG. 12 shows a diagram of a system including a base station that supports energy pattern-based DFS for high-band spectrum sharing in accordance with aspects of the present disclosure.

FIG. 12 shows a diagram of a system 1200 including a device 1205 that supports energy pattern-based DFS for high-band spectrum sharing in accordance with aspects of the present disclosure. The device 1205 may be an aspect of or include the components of a wireless device (e.g., a device 805, a device 905, or a base station 105) as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). In one aspect, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. In one aspect, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an aspect of a transmitter 815, a transmitter 915, a receiver 810, a receiver 910, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting energy pattern-based DFS for high-band spectrum sharing). In one aspect, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. In one aspect, the inter-station communications manager 1245 may coordinate scheduling for transmissions to UEs 115 for various interference mitigation techniques such as beamforming or joint transmission. In some aspects, the inter-station communications manager 1245 may provide an X2 interface within an LTE/LTE-A wireless communications network technology to provide communication between base stations 105.

The communications manager 1220 may support wireless communications implemented by a first wireless device in accordance with aspects as disclosed herein. In one aspect, the communications manager 1220 may be configured as or otherwise support a means for monitoring a channel during a set of multiple periodic energy detection intervals. The communications manager 1220 may be configured as or otherwise support a means for detecting an energy pattern on the channel based on the monitoring. The communications manager 1220 may be configured as or otherwise support a means for determining a characteristic corresponding to the energy pattern and associated with a second wireless device transmitting on the channel. The communications manager 1220 may be configured as or otherwise support a means for modifying timing for transmission of a message on the channel based on determining the characteristic associated with the second wireless device transmitting on the channel.

Additionally or alternatively, the communications manager 1220 may support wireless communications implemented by a wireless device in accordance with aspects as disclosed herein. In one aspect, the communications manager 1220 may be configured as or otherwise support a means for determining an energy pattern corresponding to a characteristic for the wireless device, where the energy pattern includes at least two sub-periods of different energy levels. The communications manager 1220 may be configured as or otherwise support a means for transmitting the energy pattern on a channel prior to transmitting each of a set of multiple portions of a message on the channel. The communications manager 1220 may be configured as or otherwise support a means for transmitting the set of multiple portions of the message on the channel based on transmitting the energy pattern on the channel.

By including or configuring the communications manager 1220 in accordance with aspects as described herein, the device 1205 may support techniques for improved communication reliability based on using energy patterns to promote coexistence of multiple different RATs on a channel in an unlicensed spectrum. In some aspects, transmitting an energy pattern on the channel prior to a data transmission may enable the device 1205 to receive the data transmission with a decreased likelihood of experiencing interference.

In some aspects, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some aspects, one or more functions described with reference to the communications manager 1220 may be supported by or performed by the processor 1240, the memory 1230, the code 1235, or any combination thereof. In one aspect, the code 1235 may include instructions executable by the processor 1240 to cause the device 1205 to perform various aspects of energy pattern-based DFS for high-band spectrum sharing as described herein, or the processor 1240 and the memory 1230 may be otherwise configured to perform or support such operations.

FIG. 13 shows a flowchart illustrating a method 1300 that supports energy pattern-based DFS for high-band spectrum sharing in accordance with aspects of the present disclosure. The operations of the method 1300 may be implemented by a first wireless device (e.g., a UE or a base station) or its components as described herein. In one aspect, the operations of the method 1300 may be performed by a wireless device as described with reference to FIGS. 1 through 12. In some aspects, a wireless device may execute a set of instructions to control the functional elements of the wireless device to perform the described functions. Additionally or alternatively, the wireless device may perform aspects of the described functions using special-purpose hardware.

At 1305, the method may include monitoring a channel during a set of multiple periodic energy detection intervals. The operations of 1305 may be performed in accordance with aspects as disclosed herein. In some aspects, aspects of the operations of 1305 may be performed by a channel monitoring component 1025 as described with reference to FIG. 10.

At 1310, the method may include detecting an energy pattern on the channel based on the monitoring. The operations of 1310 may be performed in accordance with aspects as disclosed herein. In some aspects, aspects of the operations of 1310 may be performed by an energy pattern detecting component 1030 as described with reference to FIG. 10.

At 1315, the method may include determining a characteristic corresponding to the energy pattern and associated with a second wireless device transmitting on the channel. The operations of 1315 may be performed in accordance with aspects as disclosed herein. In some aspects, aspects of the operations of 1315 may be performed by a characteristic determining component 1035 as described with reference to FIG. 10.

At 1320, the method may include modifying timing for transmission of a message on the channel based on determining the characteristic associated with the second wireless device transmitting on the channel. The operations of 1320 may be performed in accordance with aspects as disclosed herein. In some aspects, aspects of the operations of 1320 may be performed by a transmission timing component 1040 as described with reference to FIG. 10.

FIG. 14 shows a flowchart illustrating a method 1400 that supports energy pattern-based DFS for high-band spectrum sharing in accordance with aspects of the present disclosure. The operations of the method 1400 may be implemented by a first wireless device (e.g., a UE or a base station) or its components as described herein. In one aspect, the operations of the method 1400 may be performed by a wireless device as described with reference to FIGS. 1 through 12. In some aspects, a wireless device may execute a set of instructions to control the functional elements of the wireless device to perform the described functions. Additionally or alternatively, the wireless device may perform aspects of the described functions using special-purpose hardware.

At 1405, the method may include monitoring a channel during a set of multiple periodic energy detection intervals. The operations of 1405 may be performed in accordance with aspects as disclosed herein. In some aspects, aspects of the operations of 1405 may be performed by a channel monitoring component 1025 as described with reference to FIG. 10.

At 1410, the method may include detecting an energy pattern on the channel based on the monitoring. The operations of 1410 may be performed in accordance with aspects as disclosed herein. In some aspects, aspects of the operations of 1410 may be performed by an energy pattern detecting component 1030 as described with reference to FIG. 10.

At 1415, the method may include determining a characteristic corresponding to the energy pattern and associated with a second wireless device transmitting on the channel, where the characteristic includes a RAT associated with the second wireless device. The operations of 1415 may be performed in accordance with aspects as disclosed herein. In some aspects, aspects of the operations of 1415 may be performed by a characteristic determining component 1035 as described with reference to FIG. 10.

At 1420, the method may include determining that the RAT associated with the second wireless device has priority over a second RAT associated with the first wireless device. The operations of 1420 may be performed in accordance with aspects as disclosed herein. In some aspects, aspects of the operations of 1420 may be performed by a characteristic determining component 1035 as described with reference to FIG. 10.

At 1425, the method may include modifying timing for transmission of a message on the channel based on determining the characteristic associated with the second wireless device transmitting on the channel. In some aspects, the method may include delaying the timing for transmission of at least a portion of the message on the channel based on a non-occupancy period for the channel and the RAT associated with the second wireless device having priority over the second RAT associated with the first wireless device. The operations of 1425 may be performed in accordance with aspects as disclosed herein. In some aspects, aspects of the operations of 1425 may be performed by a transmission timing component 1040 as described with reference to FIG. 10.

FIG. 15 shows a flowchart illustrating a method 1500 that supports energy pattern-based DFS for high-band spectrum sharing in accordance with aspects of the present disclosure. The operations of the method 1500 may be implemented by a first wireless device (e.g., a UE or a base station) or its components as described herein. In one aspect, the operations of the method 1500 may be performed by a wireless device as described with reference to FIGS. 1 through 12. In some aspects, a wireless device may execute a set of instructions to control the functional elements of the wireless device perform the described functions. Additionally or alternatively, the wireless device may perform aspects of the described functions using special-purpose hardware.

At 1505, the method may include monitoring a channel during a set of multiple periodic energy detection intervals. The operations of 1505 may be performed in accordance with aspects as disclosed herein. In some aspects, aspects of the operations of 1505 may be performed by a channel monitoring component 1025 as described with reference to FIG. 10.

At 1510, the method may include detecting an energy pattern on the channel based on the monitoring. The operations of 1510 may be performed in accordance with aspects as disclosed herein. In some aspects, aspects of the operations of 1510 may be performed by an energy pattern detecting component 1030 as described with reference to FIG. 10.

At 1515, the method may include determining a characteristic corresponding to the energy pattern and associated with a second wireless device transmitting on the channel, where the characteristic includes a priority level associated with the second wireless device. The operations of 1515 may be performed in accordance with aspects as disclosed herein. In some aspects, aspects of the operations of 1515 may be performed by a characteristic determining component 1035 as described with reference to FIG. 10.

At 1520, the method may include determining that the priority level associated with the second wireless device is greater than a second priority level associated with the first wireless device. The operations of 1520 may be performed in accordance with aspects as disclosed herein. In some aspects, aspects of the operations of 1520 may be performed by a characteristic determining component 1035 as described with reference to FIG. 10.

At 1525, the method may include modifying timing for transmission of a message on the channel based on determining the characteristic associated with the second wireless device transmitting on the channel. In some aspects, the method may include delaying the timing for transmission of at least a portion of the message on the channel based on a non-occupancy period for the channel and the priority level associated with the second wireless device being greater than the second priority level associated with the first wireless device. The operations of 1525 may be performed in accordance with aspects as disclosed herein. In some aspects, aspects of the operations of 1525 may be performed by a transmission timing component 1040 as described with reference to FIG. 10.

FIG. 16 shows a flowchart illustrating a method 1600 that supports energy pattern-based DFS for high-band spectrum sharing in accordance with aspects of the present disclosure. The operations of the method 1600 may be implemented by a wireless device (e.g., a UE or a base station) or its components as described herein. In one aspect, the operations of the method 1600 may be performed by a wireless device as described with reference to FIGS. 1 through 12. In some aspects, a wireless device may execute a set of instructions to control the functional elements of the wireless device to perform the described functions. Additionally or alternatively, the wireless device may perform aspects of the described functions using special-purpose hardware.

At 1605, the method may include determining an energy pattern corresponding to a characteristic for the wireless device, where the energy pattern includes at least two sub-periods of different energy levels. The operations of 1605 may be performed in accordance with aspects as disclosed herein. In some aspects, aspects of the operations of 1605 may be performed by an energy pattern determination component 1045 as described with reference to FIG. 10.

At 1610, the method may include transmitting the energy pattern on a channel prior to transmitting each of a set of multiple portions of a message on the channel. The operations of 1610 may be performed in accordance with aspects as disclosed herein. In some aspects, aspects of the operations of 1610 may be performed by an energy pattern transmission component 1050 as described with reference to FIG. 10.

At 1615, the method may include transmitting the set of multiple portions of the message on the channel based on the transmitting the energy pattern on the channel. The operations of 1615 may be performed in accordance with aspects as disclosed herein. In some aspects, aspects of the operations of 1615 may be performed by a message transmission component 1055 as described with reference to FIG. 10.

FIG. 17 shows a flowchart illustrating a method 1700 that supports energy pattern-based DFS for high-band spectrum sharing in accordance with aspects of the present disclosure. The operations of the method 1700 may be implemented by a wireless device (e.g., a UE or a base station) or its components as described herein. In one aspect, the operations of the method 1700 may be performed by a wireless device as described with reference to FIGS. 1 through 12. In some aspects, a wireless device may execute a set of instructions to control the functional elements of the wireless device to perform the described functions. Additionally or alternatively, the wireless device may perform aspects of the described functions using special-purpose hardware.

At 1705, the method may include determining an energy pattern corresponding to a characteristic for the wireless device, where the energy pattern includes at least two sub-periods of different energy levels. The operations of 1705 may be performed in accordance with aspects as disclosed herein. In some aspects, aspects of the operations of 1705 may be performed by an energy pattern determination component 1045 as described with reference to FIG. 10.

At 1710, the method may include selecting a transmit power for the energy pattern based on the characteristic for the wireless device, where the energy pattern is transmitted using the transmit power. The operations of 1710 may be performed in accordance with aspects as disclosed herein. In some aspects, aspects of the operations of 1710 may be performed by a transmit power selection component 1065 as described with reference to FIG. 10.

At 1715, the method may include transmitting the energy pattern on a channel prior to transmitting each of a set of multiple portions of a message on the channel. The operations of 1715 may be performed in accordance with aspects as disclosed herein. In some aspects, aspects of the operations of 1715 may be performed by an energy pattern transmission component 1050 as described with reference to FIG. 10.

At 1720, the method may include transmitting the set of multiple portions of the message on the channel based on the transmitting the energy pattern on the channel. The operations of 1720 may be performed in accordance with aspects as disclosed herein. In some aspects, aspects of the operations of 1720 may be performed by a message transmission component 1055 as described with reference to FIG. 10.

FIG. 18 shows a flowchart illustrating a method 1800 that supports energy pattern-based DFS for high-band spectrum sharing in accordance with aspects of the present disclosure. The operations of the method 1800 may be implemented by a wireless device (e.g., a UE or a base station) or its components as described herein. In one aspect, the operations of the method 1800 may be performed by a wireless device as described with reference to FIGS. 1 through 12. In some aspects, a wireless device may execute a set of instructions to control the functional elements of the wireless device to perform the described functions. Additionally or alternatively, the wireless device may perform aspects of the described functions using special-purpose hardware.

At 1805, the method may include determining an energy pattern corresponding to a characteristic for the wireless device, where the energy pattern includes at least two sub-periods of different energy levels. The operations of 1805 may be performed in accordance with aspects as disclosed herein. In some aspects, aspects of the operations of 1805 may be performed by an energy pattern determination component 1045 as described with reference to FIG. 10.

At 1810, the method may include selecting a duration for the energy pattern based on the characteristic for the wireless device, where the energy pattern is transmitted for the duration. The operations of 1810 may be performed in accordance with aspects as disclosed herein. In some aspects, aspects of the operations of 1810 may be performed by a pattern duration selection component 1070 as described with reference to FIG. 10.

At 1815, the method may include transmitting the energy pattern on a channel prior to transmitting each of a set of multiple portions of a message on the channel. The operations of 1815 may be performed in accordance with aspects as disclosed herein. In some aspects, aspects of the operations of 1815 may be performed by an energy pattern transmission component 1050 as described with reference to FIG. 10.

At 1820, the method may include transmitting the set of multiple portions of the message on the channel based on the transmitting the energy pattern on the channel. The operations of 1820 may be performed in accordance with aspects as disclosed herein. In some aspects, aspects of the operations of 1820 may be performed by a message transmission component 1055 as described with reference to FIG. 10.

The following provides an overview of aspects of the present disclosure:

Aspect 1: A method for wireless communications implemented by a first wireless device, comprising: monitoring a channel during a plurality of periodic energy detection intervals; detecting an energy pattern on the channel based at least in part on the monitoring; determining a characteristic corresponding to the energy pattern and associated with a second wireless device transmitting on the channel; and modifying timing for transmission of a message on the channel based at least in part on determining the characteristic associated with the second wireless device transmitting on the channel.

Aspect 2: The method of aspect 1, wherein determining the characteristic comprises: determining two or more energy levels associated with the energy pattern, wherein determining the characteristic corresponding to the energy pattern is based at least in part on determining the two or more energy levels associated with the energy pattern.

Aspect 3: The method of any of aspects 1 through 2, wherein determining the characteristic comprises: determining the characteristic corresponding to the energy pattern based at least in part on a difference between a first power level and a second power level for the energy pattern, a duration of the energy pattern, or both.

Aspect 4: The method of any of aspects 1 through 3, wherein the characteristic comprises a RAT associated with the second wireless device, the method further comprising: determining that the RAT associated with the second wireless device has priority over a second RAT associated with the first wireless device, wherein modifying the timing for the transmission of the message on the channel comprises delaying the timing for transmission of at least a portion of the message on the channel based at least in part on a non-occupancy period for the channel and the RAT associated with the second wireless device having priority over the second RAT associated with the first wireless device.

Aspect 5: The method of any of aspects 1 through 4, wherein the characteristic comprises a priority level associated with the second wireless device, the method further comprising: determining that the priority level associated with the second wireless device is greater than a second priority level associated with the first wireless device, wherein modifying the timing for transmission of the message on the channel comprises delaying the timing for transmission of at least a portion of the message on the channel based at least in part on a non-occupancy period for the channel and the priority level associated with the second wireless device being greater than the second priority level associated with the first wireless device.

Aspect 6: The method of any of aspects 1 through 5, wherein monitoring the channel comprises: monitoring the channel according to a sensing duration corresponding to a second RAT, a second priority level, or both associated with the first wireless device.

Aspect 7: The method of any of aspects 1 through 6, wherein monitoring the channel comprises: performing a beam sweep procedure for a plurality of communication beams, wherein the energy pattern is detected on at least one communication beam of the plurality of communication beams based at least in part on the beam sweep procedure.

Aspect 8: The method of aspect 7, wherein monitoring the channel comprises: monitoring the channel using each communication beam of the plurality of communication beams for a beam-specific sensing duration, wherein the beam-specific sensing duration is based at least in part on a duration of the energy pattern.

Aspect 9: The method of any of aspects 1 through 8, further comprising: transmitting a second energy pattern on the channel prior to transmission of one or more portions of the message on the channel, the second energy pattern indicating a second characteristic associated with the first wireless device.

Aspect 10: The method of aspect 9, further comprising: periodically transmitting the second energy pattern on the channel based at least in part on a frequency value, wherein the frequency value is based at least in part on the characteristic associated with the first wireless device.

Aspect 11: The method of any of aspects 1 through 10, wherein the characteristic associated with the second wireless device is configured for the second wireless device or is based at least in part on an amount of traffic on the channel.

Aspect 12: The method of any of aspects 1 through 11, wherein the channel corresponds to a shared mmW band.

Aspect 13: A method for wireless communications implemented by a wireless device, comprising: determining an energy pattern corresponding to a characteristic for the wireless device, wherein the energy pattern comprises at least two sub-periods of different energy levels; transmitting the energy pattern on a channel prior to transmitting each of a plurality of portions of a message on the channel; and transmitting the plurality of portions of the message on the channel based at least in part on the transmitting the energy pattern on the channel.

Aspect 14: The method of aspect 13, wherein determining the energy pattern comprises: determining an on-off pattern for the energy pattern, an energy level pattern for the energy pattern, or a combination thereof based at least in part on the characteristic for the wireless device.

Aspect 15: The method of any of aspects 13 through 14, further comprising: selecting a transmit power for the energy pattern based at least in part on the characteristic for the wireless device, wherein the energy pattern is transmitted using the transmit power.

Aspect 16: The method of any of aspects 13 through 15, further comprising: selecting a duration for the energy pattern based at least in part on the characteristic for the wireless device, wherein the energy pattern is transmitted for the duration.

Aspect 17: The method of any of aspects 13 through 16, wherein transmitting the energy pattern comprises: performing a beam sweep procedure for a plurality of communication beams, wherein the energy pattern is transmitted on each communication beam of the plurality of communication beams based at least in part on the beam sweep procedure.

Aspect 18: The method of aspect 17, wherein transmitting the energy pattern comprises: transmitting a plurality of repetitions of the energy pattern on at least one communication beam of the plurality of communication beams.

Aspect 19: The method of any of aspects 13 through 18, wherein transmitting the energy pattern comprises: periodically transmitting the energy pattern on the channel based at least in part on a frequency value, wherein the frequency value is based at least in part on the characteristic for the wireless device.

Aspect 20: The method of any of aspects 13 through 19, wherein the characteristic for the wireless device is configured at the wireless device.

Aspect 21: The method of any of aspects 13 through 19, wherein the characteristic comprises a priority level of the wireless device, the method further comprising: sensing an amount of traffic on the channel; and determining the priority level for the wireless device based at least in part on the amount of traffic on the channel.

Aspect 22: The method of any of aspects 13 through 21, wherein the channel corresponds to a shared mmW band.

Aspect 23: The method of any of aspects 13 through 22, wherein the characteristic comprises a RAT, a priority level, or both.

Aspect 24: An apparatus for wireless communications implemented by a first wireless device, comprising a processor; memory coupled with the processor; and instructions stored in the memory and executable by the processor to cause the apparatus to perform a method of any of aspects 1 through 12.

Aspect 25: An apparatus for wireless communications implemented by a first wireless device, comprising at least one means for performing a method of any of aspects 1 through 12.

Aspect 26: A non-transitory computer-readable medium storing code for wireless communications implemented by a first wireless device, the code comprising instructions executable by a processor to perform a method of any of aspects 1 through 12.

Aspect 27: An apparatus for wireless communications implemented by a wireless device, comprising a processor; memory coupled with the processor; and instructions stored in the memory and executable by the processor to cause the apparatus to perform a method of any of aspects 13 through 23.

Aspect 28: An apparatus for wireless communications implemented by a wireless device, comprising at least one means for performing a method of any of aspects 13 through 23.

Aspect 29: A non-transitory computer-readable medium storing code for wireless communications implemented by a wireless device, the code comprising instructions executable by a processor to perform a method of any of aspects 13 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. In one aspect, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. In one aspect, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other aspects and implementations are within the scope of the disclosure and appended claims. In one aspect, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. In one aspect, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, In one aspect, a list of at least one of A, B, or C means A or B or C or AB or AC or BC or ABC (i.e., A and B and C). Also, as used herein, the phrase "based on" shall not be construed as a reference to a closed set of conditions. In one aspect, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the aspects that may be implemented or that are within the scope of the claims. The term "example" used herein means "serving as an aspect, instance, or illustration," and not "preferred" or "advantageous over other aspects." The detailed description includes specific details for the purpose of providing an understanding of the described techniques. These techniques, however, may be practiced without these specific details. In some instances, known structures and devices are shown in block diagram form in order to avoid obscuring the concepts of the described aspects.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the aspects and designs described herein but is to be accorded the broadest scope consistent with the principles and novel features disclosed herein.

What is claimed is:

1. A method for wireless communications implemented by a first wireless device, comprising:
 monitoring a channel during a plurality of periodic energy detection intervals;
 detecting a first energy pattern via the channel based at least in part on the monitoring, wherein the first energy pattern comprises two or more different energy levels;
 determining a characteristic corresponding to the first energy pattern and associated with a second wireless device transmitting via the channel based at least in part on the two or more different energy levels of the first energy pattern;
 modifying timing for transmission of a message via the channel based at least in part on the determining the characteristic associated with the second wireless device transmitting via the channel; and periodically transmitting a second energy pattern via the channel based at least in part on a periodicity for energy pattern signaling for the first wireless device, wherein the periodicity is based at least in part on a second characteristic associated with the first wireless device.

2. The method of claim 1, wherein the determining the characteristic comprises:
 determining the two or more different energy levels of the first energy pattern.

3. The method of claim 1, wherein the determining the characteristic comprises:
 determining the characteristic corresponding to the first energy pattern based at least in part on a difference between the two or more different energy levels of the first energy pattern, a duration of the first energy pattern, or both.

4. The method of claim 1, wherein the characteristic comprises a radio access technology associated with the second wireless device, the method further comprising:
 determining that the radio access technology associated with the second wireless device has priority over a second radio access technology associated with the first wireless device, wherein the modifying the timing for the transmission of the message via the channel comprises delaying the timing for the transmission of at least a portion of the message via the channel based at least in part on a non-occupancy period for the channel and the radio access technology associated with the second wireless device having priority over the second radio access technology associated with the first wireless device.

5. The method of claim 1, wherein the characteristic comprises a priority level associated with the second wireless device, the method further comprising:
 determining that the priority level associated with the second wireless device is greater than a second priority level associated with the first wireless device, wherein the modifying the timing for the transmission of the message via the channel comprises delaying the timing for the transmission of at least a portion of the message via the channel based at least in part on a non-occupancy period for the channel and the priority level associated with the second wireless device being greater than the second priority level associated with the first wireless device.

6. The method of claim 1, wherein the monitoring the channel comprises:
 monitoring the channel according to a sensing duration corresponding to a second radio access technology, a second priority level, or both associated with the first wireless device.

7. The method of claim 1, wherein the monitoring the channel comprises:
 performing a beam sweep procedure for a plurality of communication beams, wherein the first energy pattern is detected on at least one communication beam of the plurality of communication beams based at least in part on the beam sweep procedure.

8. The method of claim 7, wherein the monitoring the channel comprises:
 monitoring the channel using each communication beam of the plurality of communication beams for a beam-specific sensing duration, wherein the beam-specific sensing duration is based at least in part on a duration of the first energy pattern.

9. The method of claim 1, wherein the characteristic associated with the second wireless device is configured for the second wireless device or is based at least in part on an amount of traffic on the channel.

10. The method of claim 1, wherein the channel corresponds to a shared millimeter wave band.

11. A first wireless device for wireless communications, comprising:

at least one processor;

at least one memory coupled with the at least one processor; and instructions stored in the at least one memory and executable by the at least one processor to cause the first wireless device to:

monitor a channel during a plurality of periodic energy detection intervals;

detect a first energy pattern via the channel based at least in part on the monitoring, wherein the first energy pattern comprises two or more different energy levels;

determine a characteristic corresponding to the first energy pattern and associated with a second wireless device transmitting via the channel based at least in part on the two or more different energy levels of the first energy pattern;

modify timing for transmission of a message via the channel based at least in part on determining the characteristic associated with the second wireless device transmitting via the channel; and periodically transmit a second energy pattern via the channel based at least in part on a periodicity for energy pattern signaling for the first wireless device, wherein the periodicity is based at least in part on a second characteristic associated with the first wireless device.

12. The first wireless device of claim 11, wherein the instructions to determine the characteristic are executable by the at least one processor to cause the first wireless device to determine the two or more different energy levels of the first energy pattern.

13. The first wireless device of claim 11, wherein the instructions to determine the characteristic are executable by the at least one processor to cause the first wireless device to determine the characteristic corresponding to the first energy pattern based at least in part on a difference between the two or more different energy levels of the first energy pattern, a duration of the first energy pattern, or both.

14. The first wireless device of claim 11, wherein the characteristic comprises a radio access technology associated with the second wireless device, and the instructions are further executable by the at least one processor to cause the first wireless device to determine that the radio access technology associated with the second wireless device has priority over a second radio access technology associated with the first wireless device, wherein the instructions to modify the timing for the transmission of the message via the channel are executable by the at least one processor to cause the first wireless device to delay the timing for the transmission of at least a portion of the message via the channel based at least in part on a non-occupancy period for the channel and the radio access technology associated with the second wireless device having priority over the second radio access technology associated with the first wireless device.

15. The first wireless device of claim 11, wherein the characteristic comprises a priority level associated with the second wireless device, and the instructions are further executable by the at least one processor to cause the first wireless device to determine that the priority level associated with the second wireless device is greater than a second priority level associated with the first wireless device, wherein the modifying the timing for the transmission of the message via the channel comprises delaying the timing for the transmission of at least a portion of the message via the channel based at least in part on a non-occupancy period for the channel and the priority level associated with the second wireless device being greater than the second priority level associated with the first wireless device.

16. The first wireless device of claim 11, wherein the instructions to monitor the channel are executable by the at least one processor to cause the first wireless device to monitor the channel according to a sensing duration corresponding to a second radio access technology, a second priority level, or both associated with the first wireless device.

17. The first wireless device of claim 11, wherein the instructions to monitor the channel are executable by the at least one processor to cause the first wireless device to perform a beam sweep procedure for a plurality of communication beams, wherein the first energy pattern is detected on at least one communication beam of the plurality of communication beams based at least in part on the beam sweep procedure.

18. The first wireless device of claim 17, wherein the instructions to monitor the channel are executable by the at least one processor to cause the first wireless device to monitor the channel using each communication beam of the plurality of communication beams for a beam-specific sensing duration, wherein the beam-specific sensing duration is based at least in part on a duration of the first energy pattern.

19. The first wireless device of claim 11, wherein the characteristic associated with the second wireless device is configured for the second wireless device or is based at least in part on an amount of traffic on the channel.

20. The first wireless device of claim 11, wherein the channel corresponds to a shared millimeter wave band.

21. A first wireless device for wireless communications, comprising:

means for monitoring a channel during a plurality of periodic energy detection intervals;

means for detecting a first energy pattern via the channel based at least in part on the monitoring, wherein the first energy pattern comprises two or more different energy levels;

means for determining a characteristic corresponding to the first energy pattern and associated with a second wireless device transmitting via the channel based at least in part on the two or more different energy levels of the first energy pattern;

means for modifying timing for transmission of a message via the channel based at least in part on the determining the characteristic associated with the second wireless device transmitting via the channel; and means for periodically transmitting a second energy pattern via the channel based at least in part on a periodicity for energy pattern signaling for the first wireless device, wherein the periodicity is based at least in part on a second characteristic associated with the first wireless device.

22. A non-transitory computer-readable medium storing code for wireless communications at a first wireless device, the code comprising instructions executable by one or more processors to:

monitor a channel during a plurality of periodic energy detection intervals;

detect a first energy pattern via the channel based at least in part on the monitoring, wherein the first energy pattern comprises two or more different energy levels;

determine a characteristic corresponding to the first energy pattern and associated with a second wireless device transmitting via the channel based at least in part on the two or more different energy levels of the first energy pattern;

modify timing for transmission of a message via the channel based at least in part on determining the characteristic associated with the second wireless device transmitting via the channel; and periodically transmit a second energy pattern via the channel based at least in part on a periodicity for energy pattern signaling for the first wireless device, wherein the periodicity is based at least in part on a second characteristic associated with the first wireless device.

23. The non-transitory computer-readable medium of claim 22, wherein the instructions to determine the characteristic are executable by the one or more processors to:

determine the two or more different energy levels of the first energy pattern.

24. The non-transitory computer-readable medium of claim 22, wherein the instructions to determine the characteristic are executable by the one or more processors to:

determine the characteristic corresponding to the first energy pattern based at least in part on a difference between the two or more different energy levels of the first energy pattern, a duration of the first energy pattern, or both.

25. The non-transitory computer-readable medium of claim 22, wherein the characteristic comprises a radio access technology associated with the second wireless device, and the instructions are further executable by the one or more processors to:

determine that the radio access technology associated with the second wireless device has priority over a second radio access technology associated with the first wireless device, wherein the modifying the timing for the transmission of the message via the channel comprises delaying the timing for transmission of at least a portion of the message via the channel based at least in part on a non-occupancy period for the channel and the radio access technology associated with the second wireless device having priority over the second radio access technology associated with the first wireless device.

26. The non-transitory computer-readable medium of claim 22, wherein the characteristic comprises a priority level associated with the second wireless device, and the instructions are further executable by the one or more processors to:

determine that the priority level associated with the second wireless device is greater than a second priority level associated with the first wireless device, wherein the modifying the timing for the transmission of the message via the channel comprises delaying the timing for the transmission of at least a portion of the message via the channel based at least in part on a non-occupancy period for the channel and the priority level associated with the second wireless device being greater than the second priority level associated with the first wireless device.

* * * * *